United States Patent
Ishikawa et al.

(10) Patent No.: US 8,214,117 B2
(45) Date of Patent: Jul. 3, 2012

(54) DRIVING FORCE CONTROLLING APPARATUS OF VEHICLE

(75) Inventors: Yutaka Ishikawa, Wako (JP); Makoto Kobayashi, Wako (JP); Takahito Fujita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 12/843,855

(22) Filed: Jul. 26, 2010

(65) Prior Publication Data

US 2011/0035126 A1    Feb. 10, 2011

(30) Foreign Application Priority Data

Aug. 5, 2009  (JP) .................................. 2009-182207

(51) Int. Cl.
*G06F 19/00* (2011.01)
(52) U.S. Cl. ............... 701/65; 701/52; 701/53; 701/62; 701/64; 701/72; 180/65.8; 180/65.27; 180/197; 180/233; 180/242; 477/149; 477/154; 477/155; 477/143; 477/171; 475/86; 475/120; 475/221; 475/231; 192/3.31; 192/76; 74/473.1
(58) Field of Classification Search .................... 701/51, 701/52, 53, 62, 64, 65, 72, 82, 85, 87, 88, 701/1, 22, 69, 70, 71, 73, 74, 78, 79, 84, 701/86, 81, 89; 180/65.8, 65.27, 197, 233, 180/242, 247, 248, 249, 297; 477/149, 154, 477/155, 143, 171, 191; 192/3.31, 76; 475/120, 475/86, 88, 221, 231; 74/473.1
See application file for complete search history.

(56) References Cited

U.S. PATENT DOCUMENTS

| | | | | |
|---|---|---|---|---|
| 5,014,809 A * | 5/1991 | Matsuda | ...................... | 180/248 |
| 5,882,277 A * | 3/1999 | Iizuka | ........................... | 477/125 |
| 6,189,643 B1 * | 2/2001 | Takahashi et al. | ............ | 180/248 |
| 6,570,266 B1 * | 5/2003 | Wakashiro et al. | ......... | 290/40 C |
| 6,865,467 B2 * | 3/2005 | Berger et al. | .................... | 701/51 |

FOREIGN PATENT DOCUMENTS

JP    6-289039    10/1994

* cited by examiner

*Primary Examiner* — James Trammell
*Assistant Examiner* — McDieunel Marc
(74) *Attorney, Agent, or Firm* — Ditthavong Mori & Steiner, P.C.

(57) ABSTRACT

A driving force controlling apparatus includes a driving force controller configured to determine a state of a road surface. A driving force controller is configured to control a driving force of a vehicle based on the road surface state. A rear-wheel speed sensor is configured to detect a rear-wheel speed. A low-friction-coefficient road surface determining device is configured to determine whether the road surface is a low-friction-coefficient road surface using the rear-wheel speed on a predetermined condition. A determination prohibition device is configured to prohibit the low-friction-coefficient road surface determining device from determining whether the road surface is a low-friction-coefficient road surface, if (a) the rear-wheel speed sensor is abnormal, or if (b) a predetermined time has elapsed from when a shift range is changed from a reverse range to a drive range and/or (c) a gear position has become greater than or equal to a predetermined gear position.

8 Claims, 20 Drawing Sheets

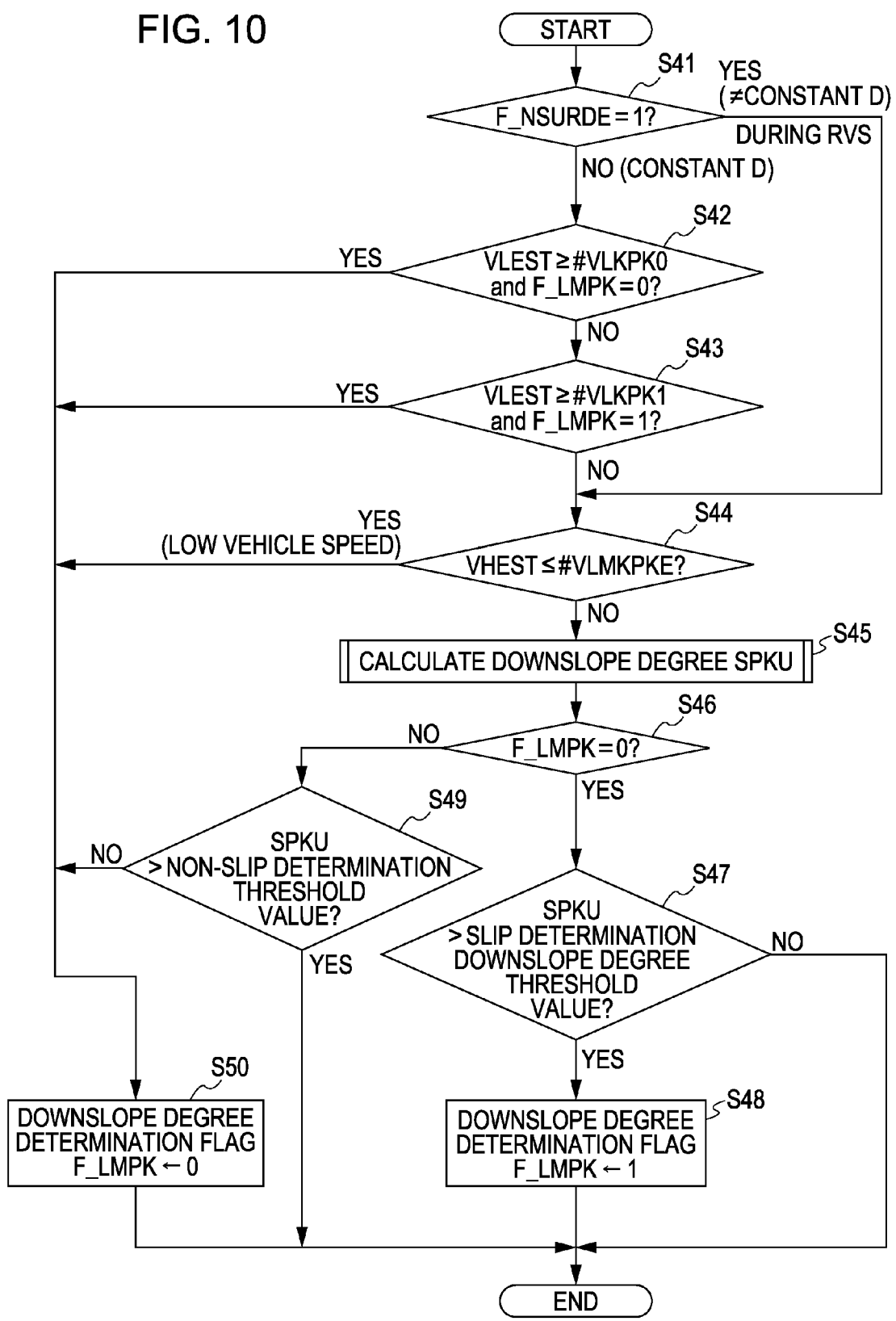

FIG. 11

|  | FIRST LOW μ ROAD SURFACE DETERMINING UNIT M1 | SECOND LOW μ ROAD SURFACE DETERMINING UNIT M2 | THIRD LOW μ ROAD SURFACE DETERMINING UNIT M3 | FOURTH LOW μ ROAD SURFACE DETERMINING UNIT M4 |
|---|---|---|---|---|
| METHOD | DETERMINATION OF DIFFERENCE BETWEEN MAXIMUM AND MINIMUM WHEEL SPEEDS OF AMONG WHEEL SPEEDS OF FOUR WHEELS F_LM4W<br><br>MINIMUM WHEEL SPEED / MAXIMUM WHEEL SPEED | DETERMINATION OF DIFFERENCE BETWEEN AVERAGE WHEEL SPEEDS OF FRONT AND REAR WHEELS F_DYS<br><br>MAXIMUM WHEEL SPEED / MINIMUM WHEEL SPEED | DETERMINATION OF WHEEL SPEEDS OF LEFT FRONT WHEEL AND RIGHT FRONT WHEEL F_DVF2W<br><br>MAXIMUM WHEEL SPEED / MINIMUM WHEEL SPEED | DETERMINATION OF DOWNSLOPE DEGREE F_LMPK<br><br>MAXIMUM WHEEL SPEED |
| STRONG POINTS | DETECTION POSSIBLE EVEN IF SLIPPING OF ANY WHEEL OCCURS (UNIVERSAL TYPE) | SINCE ROTATION STEERING AMOUNT IS NOT CONSIDERED, DETECTION PRECISION CAN BE INCREASED IN STRAIGHT-LINE TRAVEL STATE | BY LIMITING TO DETECTION OF LEFT AND RIGHT FRONT WHEELS, SETTING FOR DIFFERENTIAL GEAR PROTECTION CAN BE PERFORMED AS BEFORE | DETECTABLE EVEN FOR LOW μ FOR FOUR WHEELS AT THE SAME TIME, NOT INFLUENCED BY REAR WHEEL FAILURE |
| WEAK POINTS | DETECTION NOT POSSIBLE FOR FOUR WHEELS AT THE SAME TIME THRESHOLD VALUE MUST BE SET BY CONSIDERING ROTATION STEERING AMOUNT INFLUENCED BY REAR WHEEL FAILURE | DETECTION NOT POSSIBLE AT ALL FOR LEFT AND RIGHT WHEELS INFLUENCED BY REAR WHEEL FAILURE | CAN ONLY MAKE DETERMINATION FOR FRONT WHEELS | DETECTION PRECISION OF VERY LOW μ IS REDUCED |
| DETECTION | GOOD AT DETECTING SMALL DRIVING FORCE | GOOD AT DETECTING SMALL DRIVING FORCE | GOOD AT DETECTING SMALL DRIVING FORCE | GOOD AT DETECTING LARGE DRIVING FORCE NOT GOOD AT DETECTING SMALL DRIVING FORCE |

DRIVING FORCE CONTROLLING APPARATUS OF VEHICLE

CROSS REFERENCES TO RELATED APPLICATIONS

The present application claims priority under 35 U.S.C. §119 to Japanese Patent Application No. 2009-182207, filed Aug. 5, 2009, entitled "Driving Force Controlling Device of Vehicle." The contents of this application are incorporated herein by reference in their entirety.

BACKGROUND OF THE INVENTION

1. Field of the Invention

The present invention relates to a driving force controlling apparatus of a vehicle.

2. Description of the Related Art

Japanese Unexamined Patent Application Publication No. 6-289039 discusses a slip amount calculating device of a vehicle. In the slip amount calculating device, when rotational speed sensors for four wheels all operate normally, a slip amount is calculated on the basis of an average value of rotational speeds of left and right idle wheels and an average value of rotational speeds of left and right driving wheels. In addition, when an abnormality occurs in the rotational speed sensor of a right front wheel or in the rotational speed sensor of a right rear wheel, a slip amount is calculated on the basis of the rotational speed of a left front wheel and the rotational speed of a left rear wheel. Further, when an abnormality occurs in the rotational speed sensor of the left front wheel or the rotational speed sensor of the left rear wheel, a slip amount is calculated on the basis of the rotational speed of the right front wheel and a rotational speed of the right rear wheel.

However, in a four-wheel driving vehicle in which the front wheels are main driving wheels and the rear wheels are sub-driving wheels, although any abnormality in front-wheel speed sensors can be precisely determined by comparing outputs of the sensors with a rotational speed of an output shaft of a transmission, it is difficult to easily determine precisely any abnormality in rear-wheel speed sensors for which such a method cannot be used.

Therefore, when it is determined that a road surface is a low-friction-coefficient road surface using abnormal rear-wheel speeds output from the rear-wheel speed sensors, an erroneous determination may occur. When driving force control, such as limiting of a shift change of the transmission or fuel cut of an engine is performed on the basis of a erroneous determination result, an excessive torque is input to the transmission, thereby causing damage to a vehicle or hindering drivability of the vehicle.

SUMMARY OF THE INVENTION

According to one aspect of the present invention, a driving force controlling apparatus of a vehicle includes a driving force controller, a rear-wheel speed sensor, a low-friction-coefficient road surface determining device, and a determination prohibition device. The driving force controller is configured to determine a road surface state of a road surface along which the vehicle including an engine and a transmission travels. The driving force controller is configured to control a driving force of the vehicle based on the determined road surface state. The rear-wheel speed sensor is configured to detect a rear-wheel speed. The low-friction-coefficient road surface determining device is configured to determine whether the road surface is a low-friction-coefficient road surface using at least the rear-wheel speed detected by the rear-wheel speed sensor when a predetermined condition is established. The determination prohibition device is configured to prohibit the low-friction-coefficient road surface determining device from determining whether the road surface is a low-friction-coefficient road surface, if (a) the rear-wheel speed sensor is abnormal, or if (b) a predetermined time has elapsed from when a shift range is changed from a reverse range to a drive range and/or (c) a gear position has become greater than or equal to a predetermined gear position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a flowchart of a subroutine of the Step S1 of the main routine (fourth low-friction-coefficient road surface determining unit);

FIG. 11 illustrates strong points and weak points of the first to fourth low-friction-coefficient road surface determining units;

DESCRIPTION OF THE PREFERRED EMBODIMENTS

Embodiments of the present invention will hereunder be described with reference to FIGS. 1 to 20.

Figure 1:
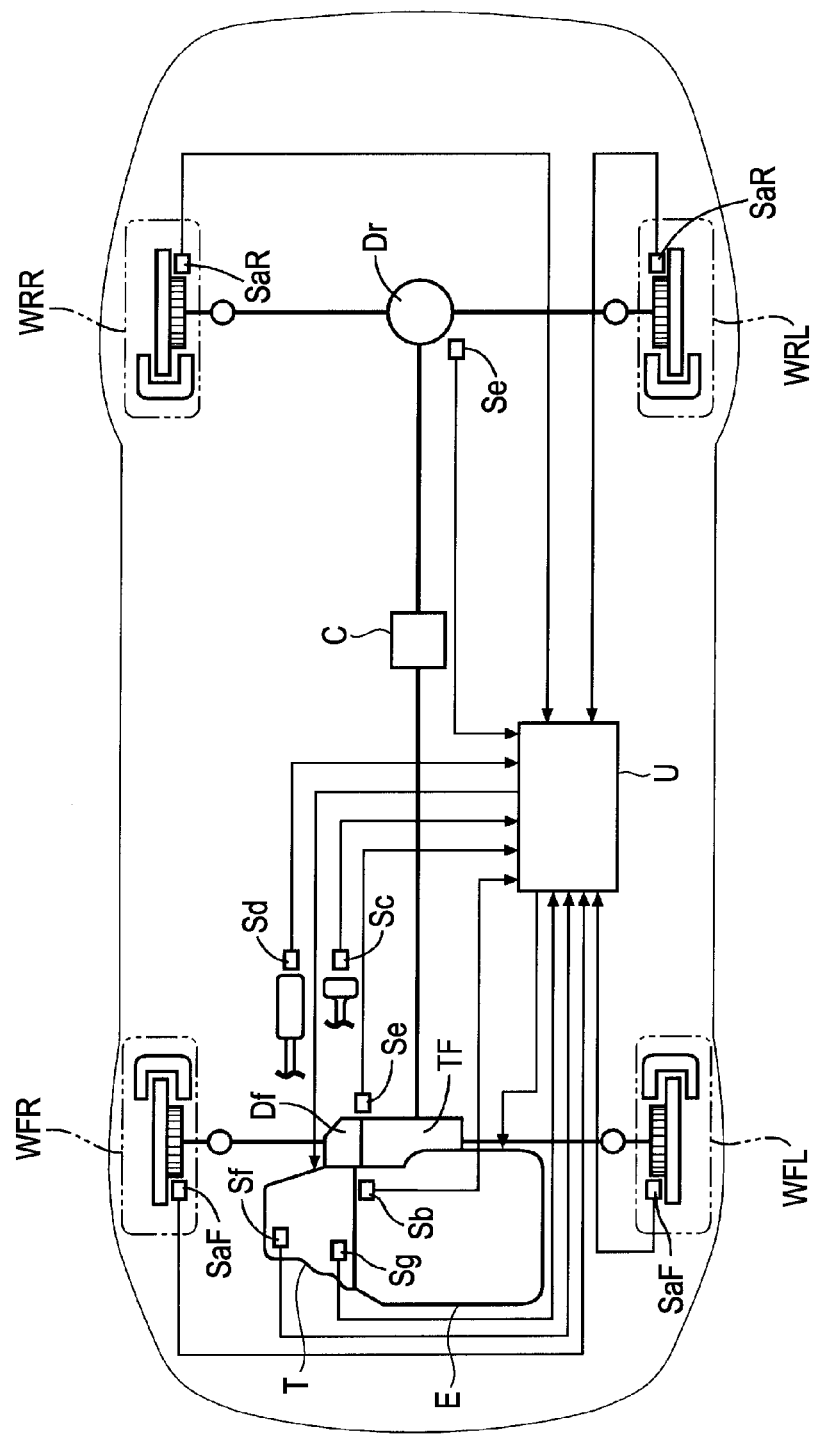
FIG. 1 shows an overall structure of a vehicle including a driving force controlling apparatus.

As shown in FIG. 1, a four-wheel drive automobile includes a left front wheel WFL and a right front wheel WFR (which are main driving wheels that are normally driven), and a left rear wheel WRL and a right rear wheel WRR (which are sub-driving wheels that are driven when necessary). A portion of a driving force of an engine E is transmitted to the left front wheel WFL and the right front wheel WFR through a transmission T and a front differential gear Df. In addition, a portion of the driving force is transmitted from the transmission T to the left rear wheel WRL and the right rear wheel WRR through a viscous coupling C and a rear differential gear Dr.

Front-wheel speed sensors SaF that detect a rotational speed of the left front wheel WRL and a rotational speed of the right front wheel WFR, rear-wheel speed sensors SaR that detect a rotational speed of the left rear wheel WRL and a rotational speed of the right rear wheel WRR, an engine rotational speed sensor Sb that detects a rotational speed of the engine, a shift range sensor Sc that detects a shift range of the transmission T, an accelerator opening sensor Sd that detects an accelerator opening, differential gear rotational speed sensors Se and Se that detect rotational speeds of front and back differential gears Df and Dr, a transmission input shaft rotational speed sensor Sf that detects a rotational speed of an input shaft of the transmission T, and a transmission output shaft rotational speed sensor Sg that detects a rotational speed of an output shaft of the transmission T are connected to an electronic control unit U that controls a shift change of the transmission T and fuel cut of the engine E. On the basis of signals from the respective sensors SaF, SaR, Sb, Sc, Sd, Se, Sf, and Sg, the electronic control unit U controls the fuel cut of the engine E and the shift change of the transmission T.

Figure 2:
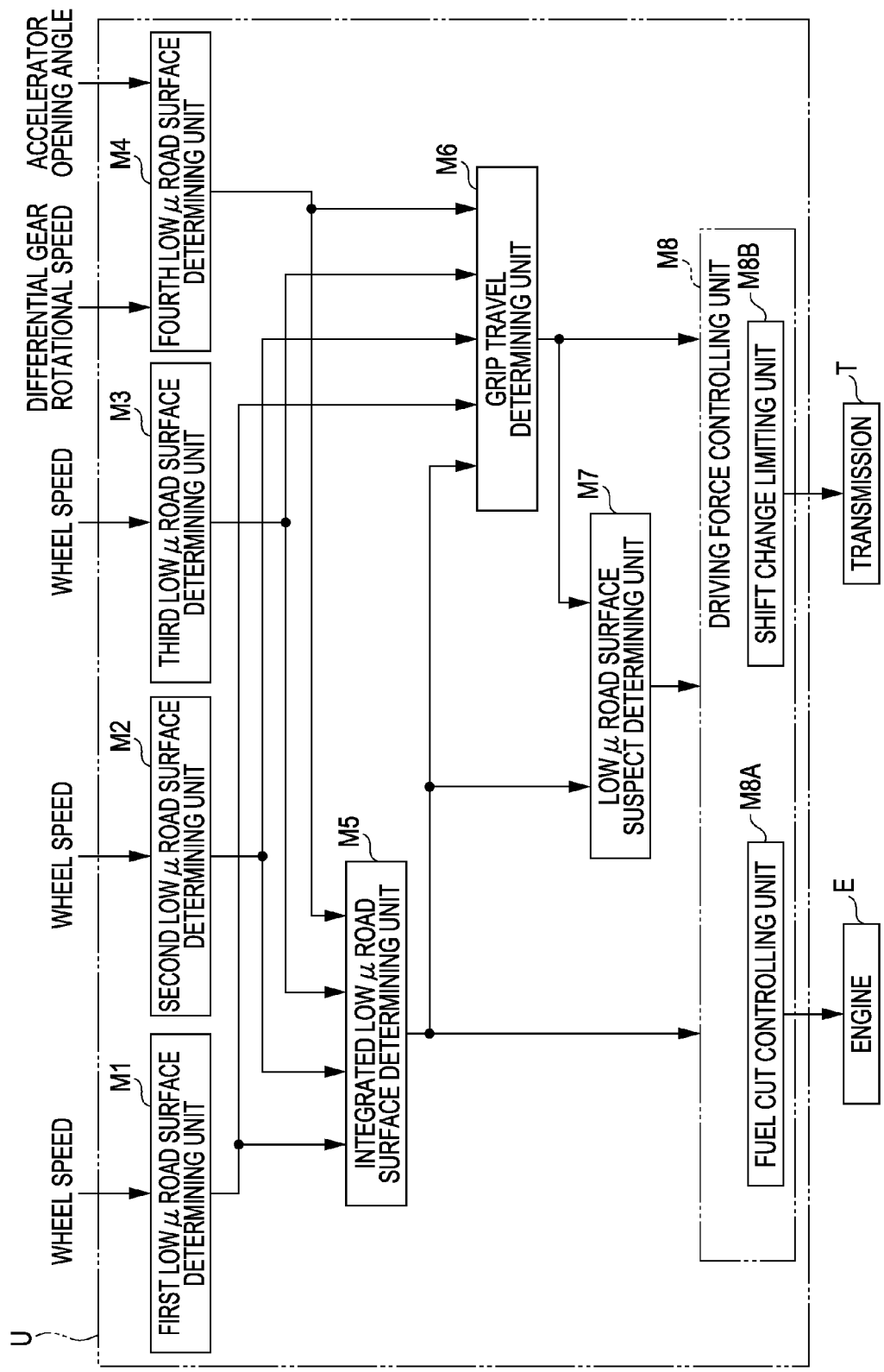
FIG. 2 is a block diagram of an electronic controlling unit of the driving force controlling apparatus.

As shown in FIG. 2, the electronic control unit U includes a first low-friction-coefficient road surface determining device M1, a second low-friction-coefficient road surface determining device M2, a third low-friction-coefficient road surface determining device M3, a fourth low-friction-coefficient road surface determining device M4, an integrated low-friction-coefficient road surface determining device M5, a grip travel determining unit M6, a low-friction-coefficient road surface suspect determining unit M7, and a driving force controller M8. The driving force controller M8 includes a fuel cut controlling unit M8A that controls fuel cut of the engine E, and a shift change limiting unit M8B that limits a shift change of the transmission T.

Next, a flowchart of a main routine will be described with reference to FIG. 3.

First, in Step S1, the first to fourth low-friction-coefficient road surface determining units M1 to M4 are used to determine whether a road surface is a low-friction-coefficient road surface using first to fourth methods described in detail later. In Step S2, the integrated low-friction-coefficient road surface determining device M5 is used to make a determination of an integrated low-friction-coefficient road surface by integrating determination results of the first to fourth methods. As a result, when an integration determination is made that an integrated low-friction-coefficient road surface determination flag F_LOMYU=0 (high-friction-coefficient road surface), the grip travel determining unit M6 determines grip travel (that is, determines whether or not the automobile is traveling while gripping the road surface without slippage of the wheels) in Step S3. As a result, when it is determined that a grip travel determination flag F_GRIP=1 (grip travel), the low-friction-coefficient road surface suspect determining unit M7 sets a low-friction-coefficient road surface suspect determination flag F_MBLM=0 (no suspicion of the road surface being a low-friction-coefficient road surface) in Step S4.

When, in Step S2, an integration determination is made that the integrated low-friction-coefficient road surface determination flag F_LOMYU=1 (low-friction-coefficient road surface), then, in Step S5, slippage of the driving wheels is restricted, and the fuel cut controlling unit M8A makes a request for a shift in a fuel cut rotational speed of the engine. In addition, when, in the Step S3, it is determined that the grip travel determination flag F_GRIP=1 (grip travel is not performed), and when the process proceeds through the Step S5, then, in Step S6, the low-friction-coefficient road surface suspect determining unit M7 sets the low-friction-coefficient road surface suspect determination flag F_MBLM=1 (there is suspicion of the road surface being a low-friction-coefficient road surface). Subsequently, in Step S7, while restricting the slippage of the driving wheels, the shift change limiting unit M8B limits shifting of the transmission T.

Figure 3:
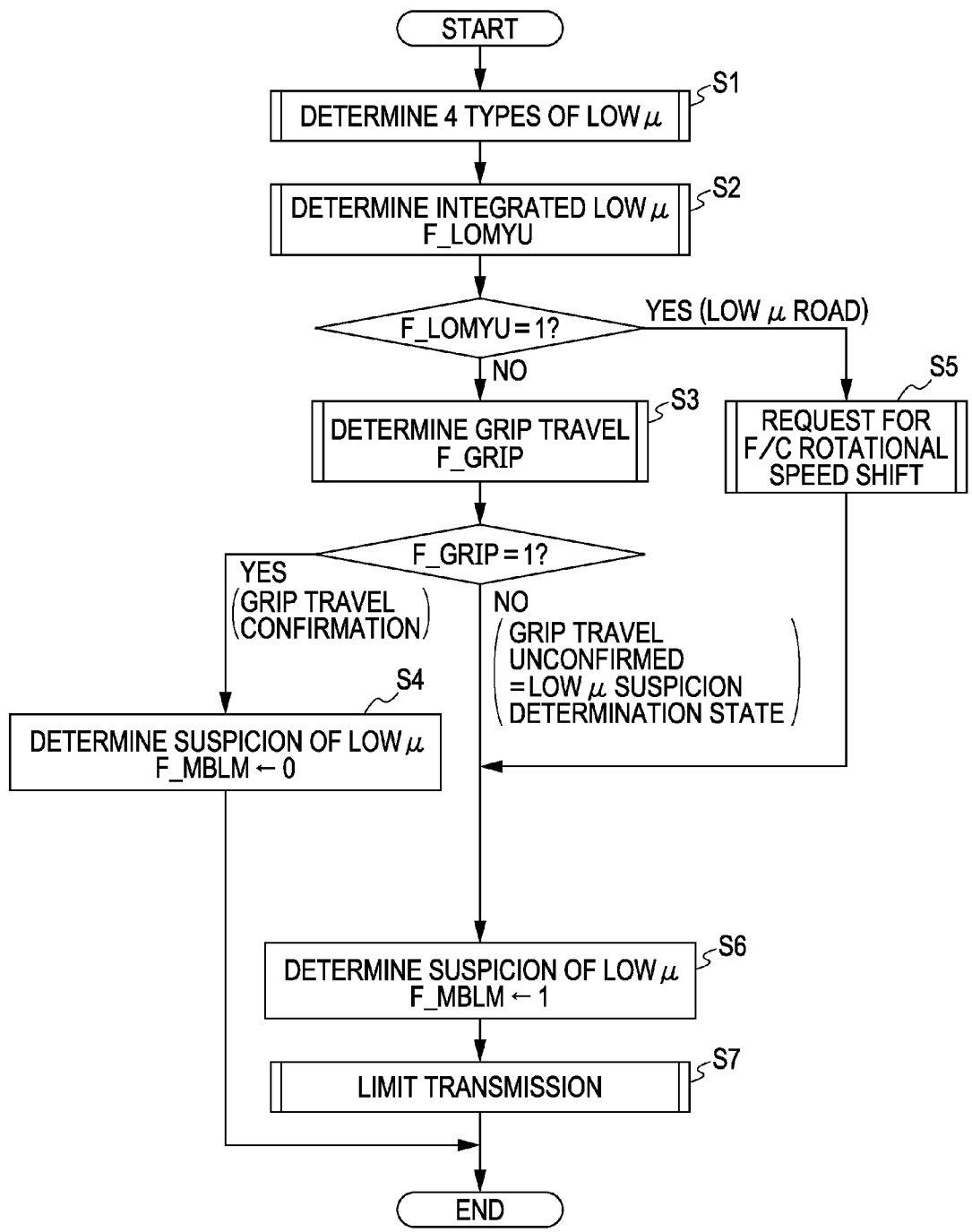
FIG. 3 is a flowchart of a main routine.

As is clear from FIG. 3, the relationships between the determination of the integrated low-friction-coefficient road surface determination flag F_LOMYU=1 (low-friction-coefficient road surface), the determination of the low-friction-coefficient road surface suspect determination flag F_MBLM=1 (there is suspicion of the road surface being a low-friction-coefficient road surface), and the determination of the grip travel determination flag F_GRIP=1 (grip travel is not performed) are as follows.

When, in Step S2, it is determined that the integrated low-friction-coefficient road surface determination flag F_LOMYU=1 (low-friction-coefficient road surface), it is automatically determined that the low-friction-coefficient road surface suspect determination flag F_MBLM=1 (there is suspicion of the road surface being a low-friction-coefficient road surface) in Step S6.

If, in Step S2, it is not determined that the integrated low-friction-coefficient road surface determination flag F_LOMYU=1 (low-friction-coefficient road surface), when it is not determined that the grip travel determination flag F_GRIP=1 (grip travel), it is automatically determined that the low-friction-coefficient road surface suspect determination flag F_MBLM=1 (there is suspicion of the road surface being a low-friction-coefficient road surface) in Step S6.

This is because, when a vehicle is on ice, a driver takes his/her foot off an accelerator pedal, so that even if an integration determination is made that the integrated low-friction-coefficient road surface determination flag F_LOMYU=0 (high-friction-coefficient road surface), the friction coefficient may actually be a low friction coefficient, as a result of which, if grip travel is not determined in the Step S3, it is determined that the low-friction-coefficient road surface suspect determination flag F_MBLM=1 (there is suspicion of the road surface being a low-friction-coefficient road surface).

If, in Step S3, it is not determined that the grip travel determination flag F_GRIP=1 (grip travel), it is determined that the low-friction-coefficient road surface suspect determination flag F_MBLM=0 (there is no suspicion of the road surface being a low-friction-coefficient road surface) in Step S4. That is, the low-friction-coefficient road surface suspect determination flag F_MBLM=0 (there is no suspicion of the road surface being a low-friction-coefficient road surface) is established only when it is determined that the grip travel determination flag F_GRIP=1 (grip travel).

TABLE 1

| | DETERMINATION | | | ACTION | |
|---|---|---|---|---|---|
| | F_LOMYU | F_MBLM | F_GRIP | SHIFT LIMITATION | F/C ROTATIONAL SPEED SHIFT |
| I | NO | NO | YES | NO | NO |
| II | YES | YES | NO | YES | YES |
| III | NO | YES | NO | YES | NO |

Table 1 summarizes the above-described operations. If the integrated low-friction-coefficient road surface determination flag F_LOMYU=0, the low-friction-coefficient road surface suspect determination flag F_MBLM=0, and the grip travel determination flag F_GRIP=1, the road surface friction coefficient is high. Therefore, shifting is not limited and fuel cut rotational speed is not shifted.

If the integrated low-friction-coefficient road surface determination flag F_LOMYU=1, the low-friction-coefficient road surface suspect determination flag F_MBLM=1, and the grip travel determination flag F_GRIP=0, the road surface friction coefficient is low. Therefore, shifting is not limited and fuel cut rotational speed is not shifted.

If the integrated low-friction-coefficient road surface determination flag F_LOMYU=0, the low-friction-coefficient road surface suspect determination flag F_MBLM=1, and the grip travel determination flag F_GRIP=0, the road surface friction coefficient may be low. Therefore, only shifting is limited and fuel cut rotational speed is not shifted.

Next, the first method of determining whether a road surface is a low-friction-coefficient road surface by the first low-friction-coefficient road surface determining device M1 will be described with reference to the flowchart of FIG. 4 which is a subroutine of the Step S1.

First, in Step S11, a maximum wheel speed and a minimum wheel speed are calculated among the wheel speeds of the four wheels. Then, in Step S12, a wheel speed difference between the maximum wheel speed and the minimum wheel speed SVLVF4R is calculated. Then, if, in Step S13, a maximum and minimum wheel speed difference determination flag F_LM4W=0 (small wheel speed difference), then, in Step S14, the wheel speed difference SVLVF4R is compared with a low-friction-coefficient road surface determination threshold value. If the wheel speed difference SVLVF4R>low friction coefficient road surface determination threshold value, then, in Step S15, the low-friction-coefficient road surface determination flag F_LM4W=1 (low-friction-coefficient road surface) is set.

In contrast, if, in the Step S13, the maximum and minimum wheel speed difference determination flag F_LM4W=1 (large wheel speed difference), then, in Step S16, the wheel speed difference SVLVF4R is compared with a low-friction-coefficient road surface cancel threshold value. If the wheel speed difference SVLVF4R>low-friction-coefficient road surface cancel threshold value, then, in Step S17, the low-friction-coefficient road surface determination flag F_LM4W=0 (high friction coefficient road surface) is set.

Figure 4:
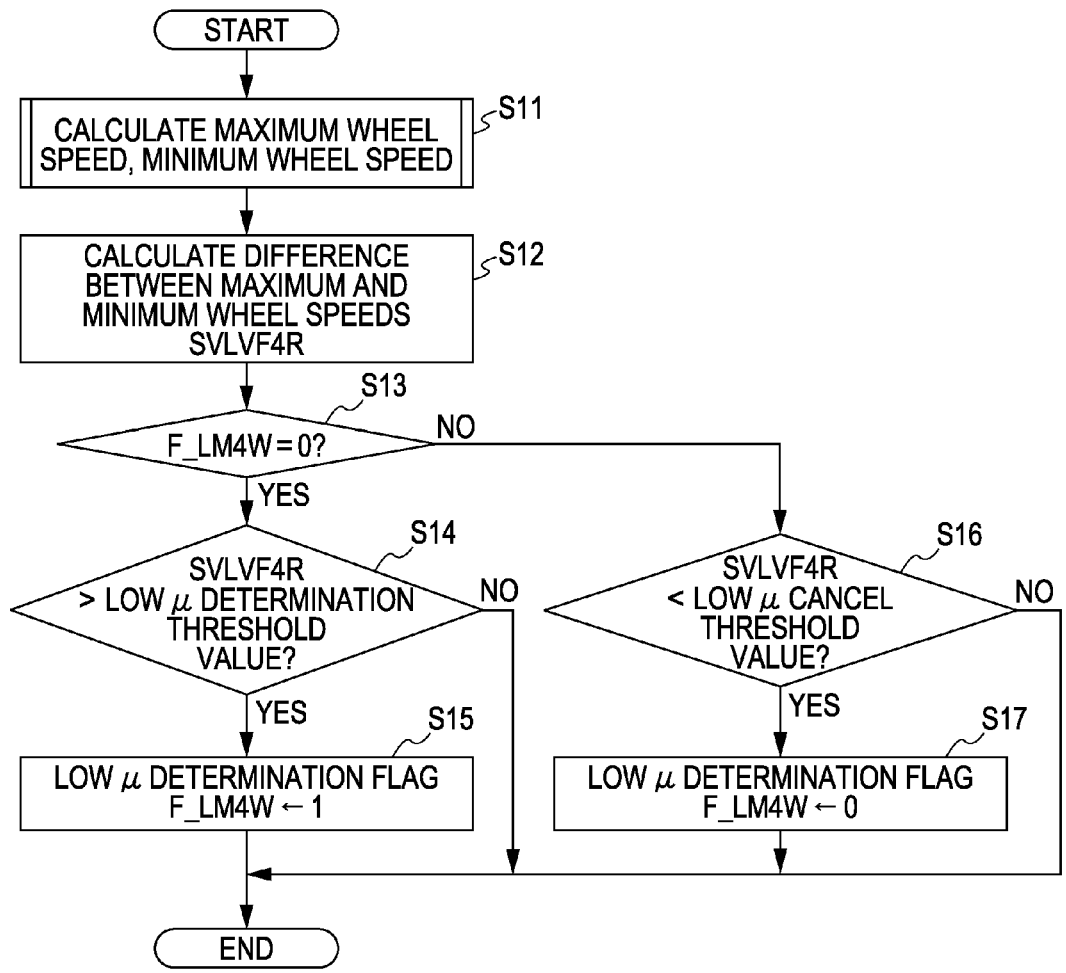
FIG. 4 is a flowchart of a subroutine of Step S1 of the main routine (first low-friction-coefficient road surface determining unit)
Figure 5:
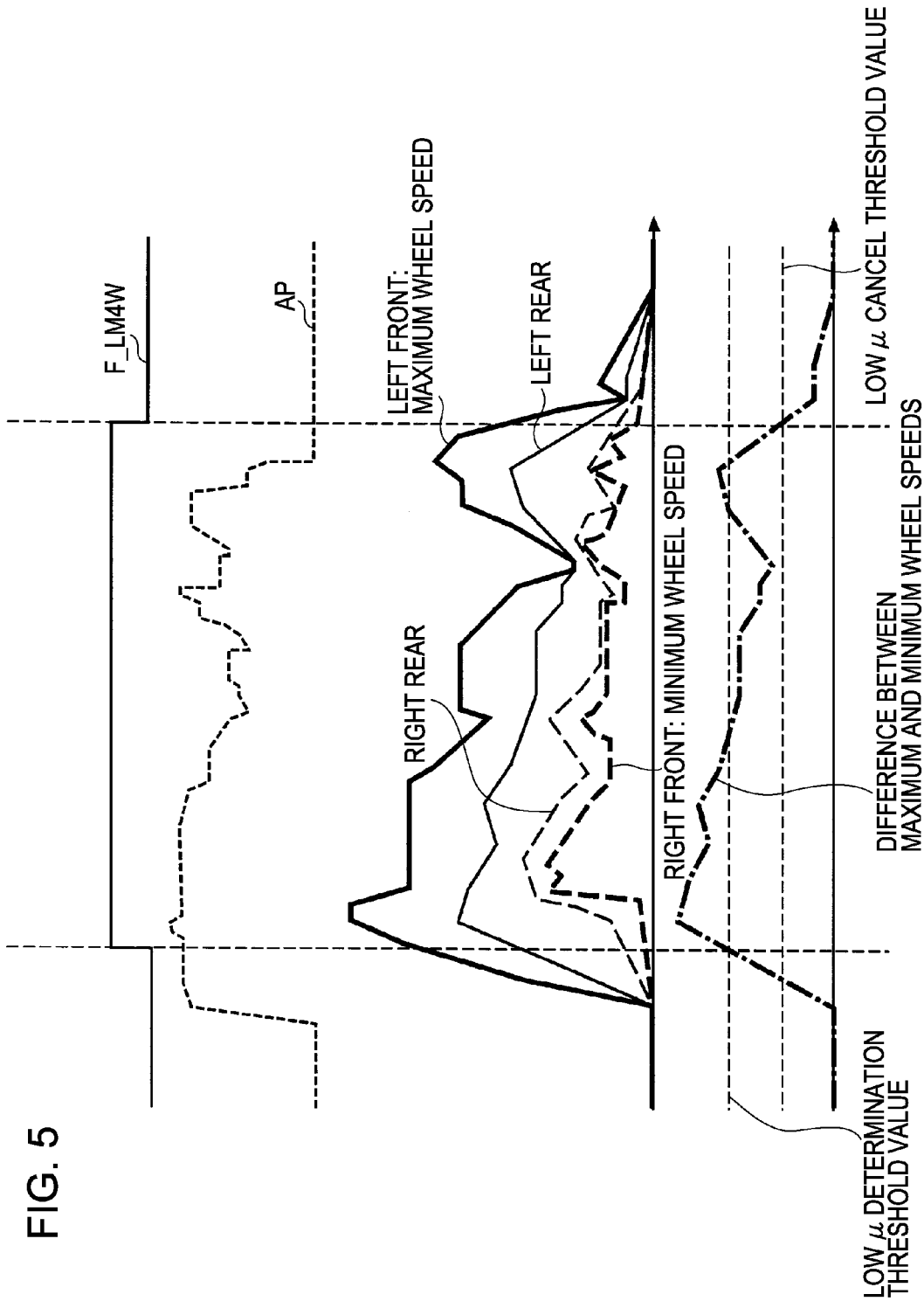
FIG. 5 is a time chart in correspondence with FIG. 4.

FIG. 5 is a time chart illustrating the operations of the flowchart shown in FIG. 4. If the wheel speed difference between the maximum wheel speed and the minimum wheel speed SVLVF4R exceeds the low-friction-coefficient road surface determination threshold value, the low-friction-coefficient road surface determination flag F_LM4W=1 is set. In contrast, if the wheel speed difference between the maximum wheel speed and the minimum wheel speed SVLVF4R is less than the low-friction-coefficient road surface cancel threshold value, the low-friction-coefficient road surface determination flag F_LM4W=0 is set.

Next, the second method of determining whether a road surface is a low-friction-coefficient road surface by the second low-friction-coefficient road surface determining device M2 will be described with reference to the flowchart of FIG. 6 which is a subroutine of the Step S1.

First, in Step S21, an average wheel speed of the left front wheel and right front wheel and an average wheel speed of the left rear wheel and the right rear wheel are calculated. Then, in Step S22, a front and rear wheel speed difference SVLVF2R, which is the difference between the average wheel speeds, is calculated. Next, if, in Step S23, a low-friction-coefficient road surface determination flag F_DYS=0 (high friction coefficient road surface), then, in Step S24, the wheel speed difference SVLVF2R is compared with the low-friction-coefficient road surface determination threshold value. If the wheel speed difference SVLVF2R>the low-friction-coefficient road surface determination threshold value, then, in Step S25, a low-friction-coefficient road surface determination flag F_DYS=1 (low-friction-coefficient road surface) is set.

In contrast, if, in the Step S23, the low-friction-coefficient road surface determination flag F_DYS=1 (low friction coefficient road surface), then, in Step S26, the wheel speed difference SVLVF2R is compared with the low-friction-coefficient road surface cancel threshold value. If the wheel speed difference SVLVF2R<the low-friction-coefficient road surface cancel threshold value, then, in Step S27, the low-friction-coefficient road surface determination flag F_DYS=0 (high-friction-coefficient road surface) is set.

Figure 6:
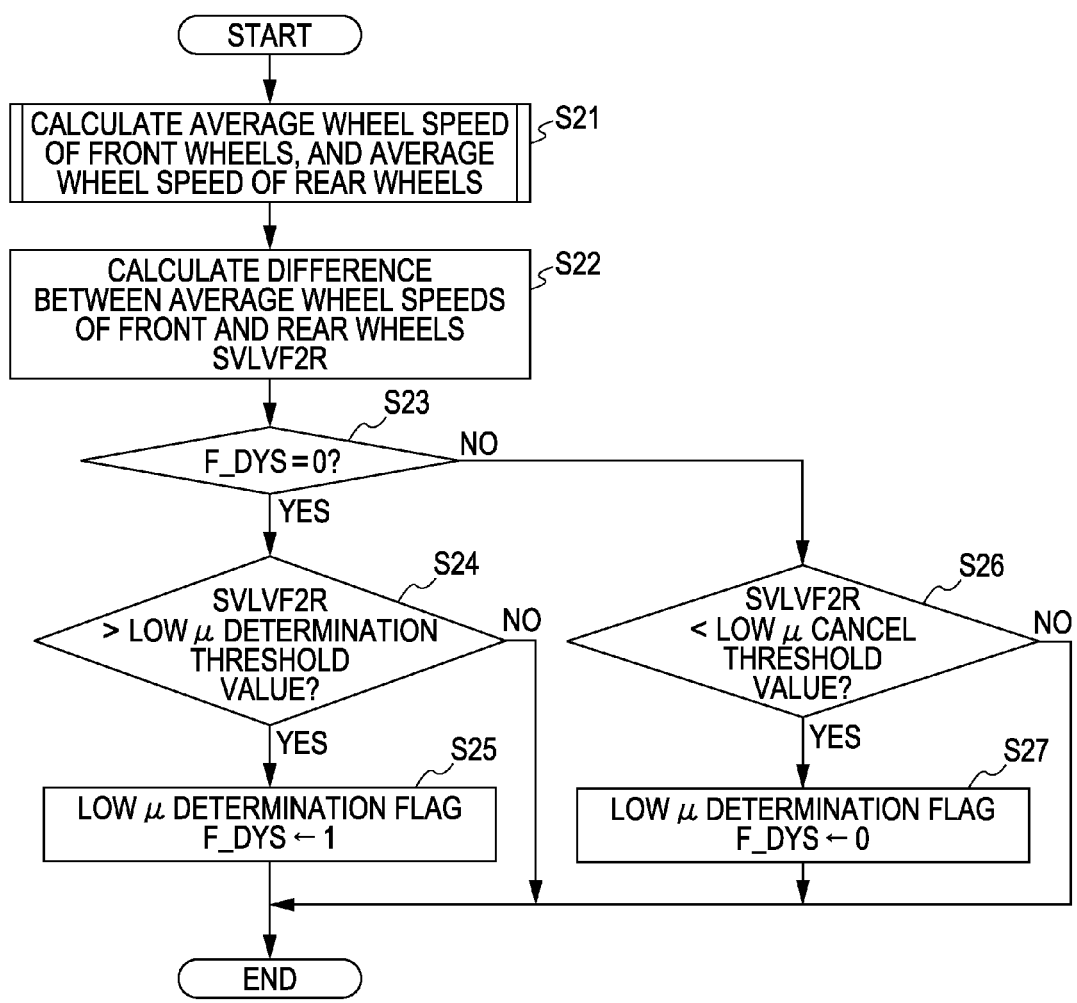
FIG. 6 is a flowchart of a subroutine of the Step S1 of the main routine (second low-friction-coefficient road surface determining unit)
Figure 7:
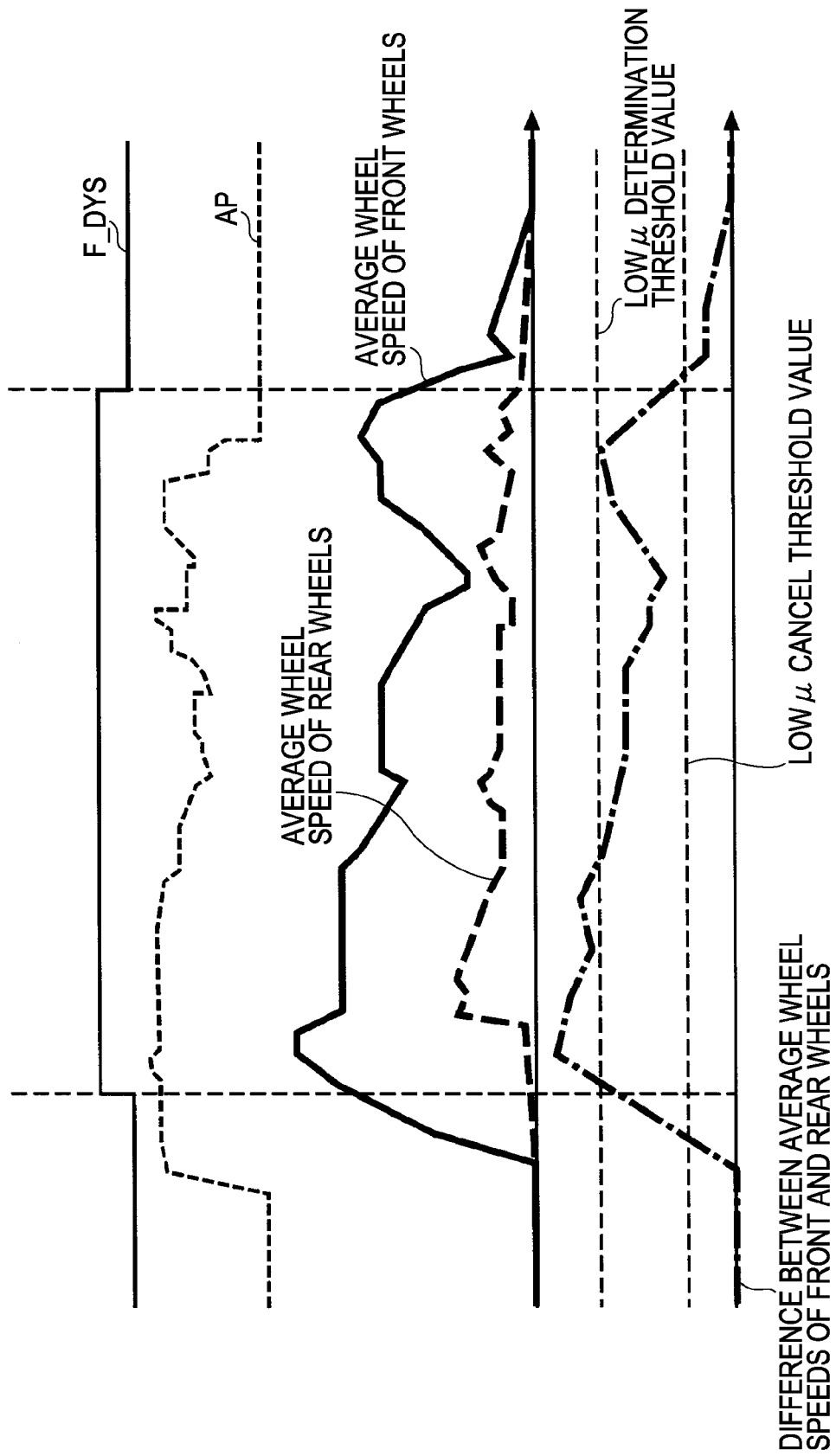
FIG. 7 is a time chart in correspondence with FIG. 6.

FIG. 7 is a time chart illustrating the operations of the flowchart shown in FIG. 6. If the front and rear wheel average wheel speed difference SVLVF2R exceeds the low-friction-coefficient road surface determination threshold value, the low-friction-coefficient road surface determination flag F_DYS=1 is set. In contrast, if the front and rear wheel average wheel speed difference SVLVF2R is less than the low-friction-coefficient road surface cancel threshold value, the low-friction-coefficient road surface determination flag F_DYS=0 is set.

Next, the third method of determining whether a road surface is a low-friction-coefficient road surface by the third low-friction-coefficient road surface determining device M3 will be described with reference to the flowchart of FIG. 8 which is a subroutine of the Step S1.

First, in Step S31, a left-front-wheel speed and a right-front-wheel speed are calculated. Then, in Step S32, a wheel speed difference between the wheel speeds of the left front wheel and the right front wheel DVF2W is calculated. If, in the next Step S33, a low-friction-coefficient road surface determination flag F_DVF2W=0 (high-friction-coefficient road surface), then, in Step S34, the wheel speed difference DVF2W is compared with the low-friction-coefficient road surface determination value. If the wheel speed difference DVF2W>the low-friction-coefficient road surface determination value, then, in Step S35, the low-friction-coefficient road surface determination flag F_DVF2W=1 (low-friction-coefficient road surface) is set.

If, in Step S33, the low-friction-coefficient road surface determination flag F_DVF2W=1 (low-friction-coefficient road surface), then, in Step S36, the wheel speed difference DVF2W is compared with the low-friction-coefficient road surface cancel value. If the wheel speed difference DVF2W<the low-friction-coefficient road surface cancel flag, then, in Step S37, a low-friction-coefficient road surface determination flag F_DVF2W=0 (high-friction-coefficient road surface) is set.

Figure 8:
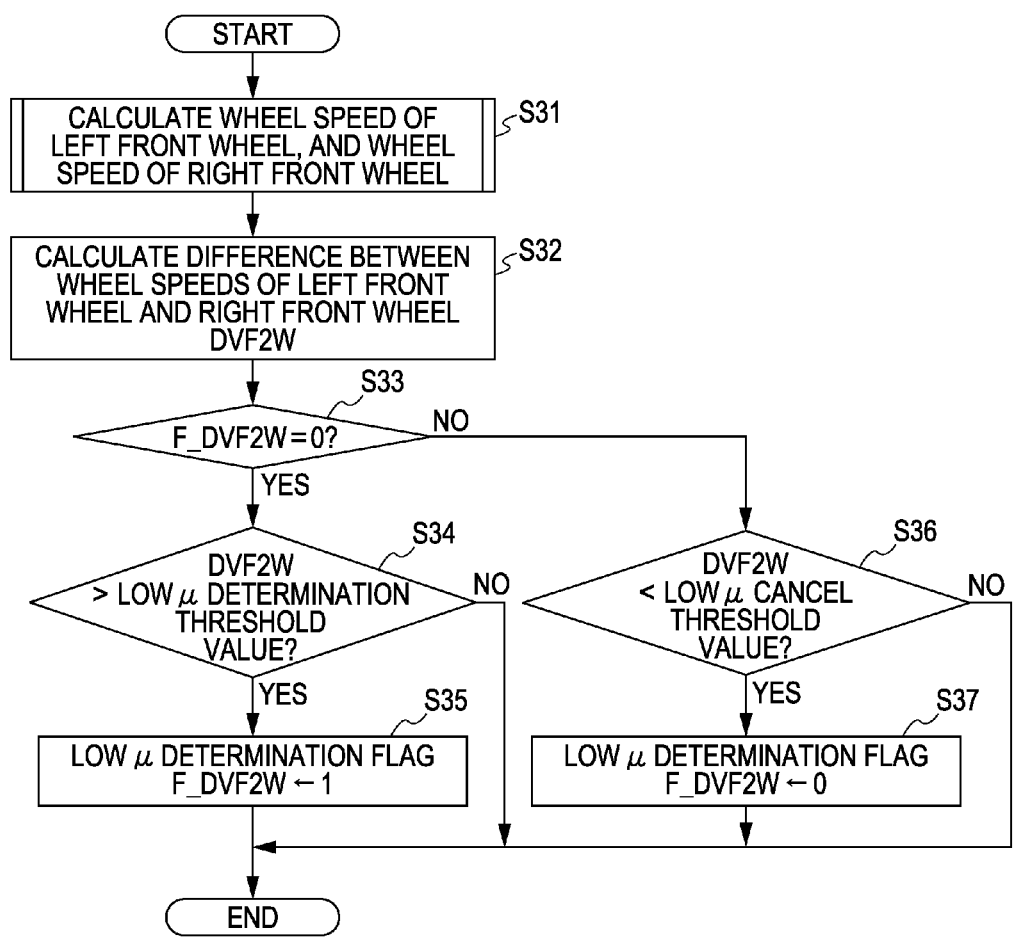
FIG. 8 is a flowchart of a subroutine of the Step S1 of the main routine (third low-friction-coefficient road surface determining unit)
Figure 9:
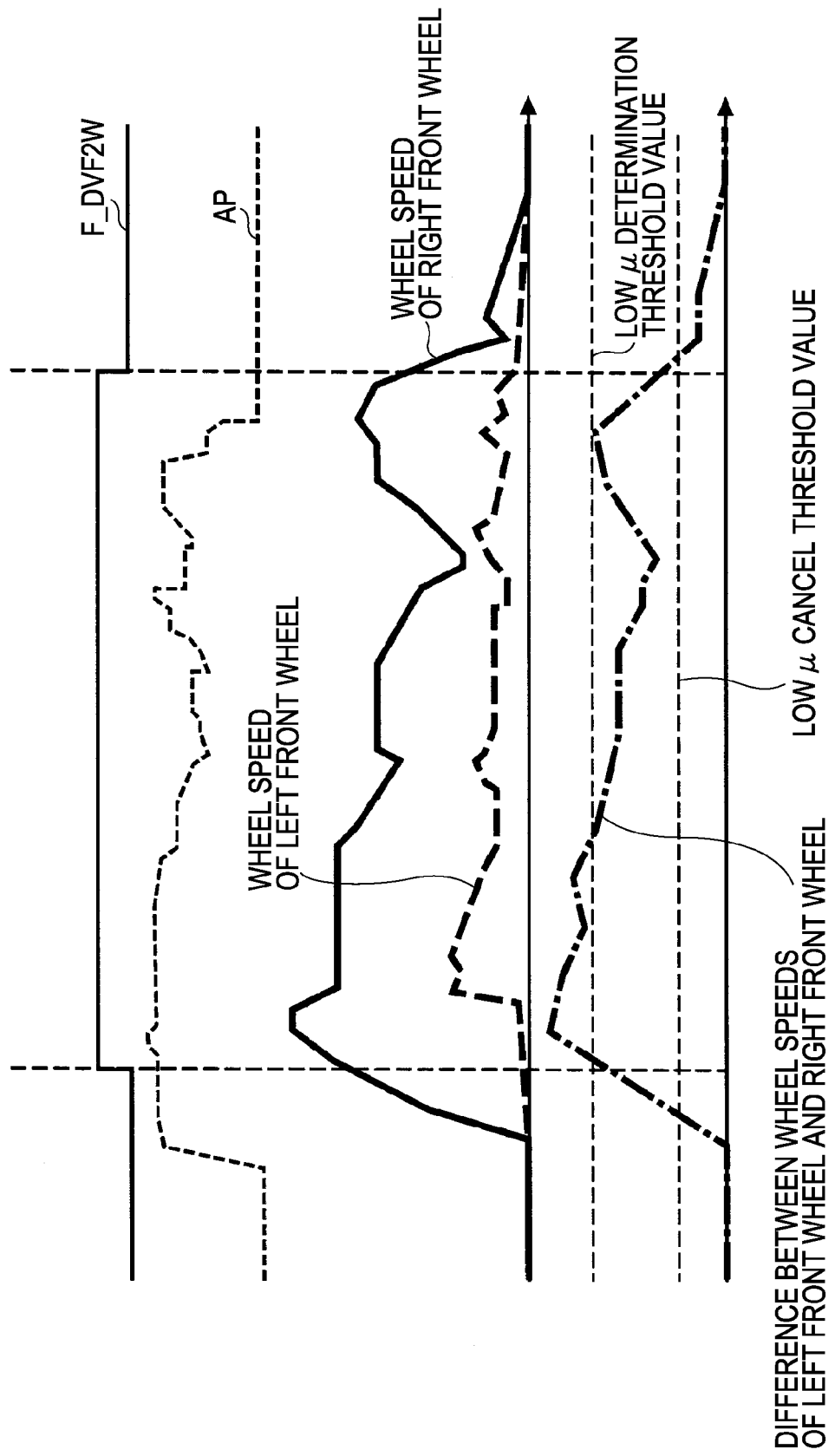
FIG. 9 is a flow chart in correspondence with FIG. 8.

FIG. 9 is a time chart illustrating the operations of the flowchart shown in FIG. 8. If the wheel speed difference between the wheel speed of the left front wheel and the wheel speed of the right front wheel DVF2W exceeds the low-friction-coefficient road surface determination threshold value, the low-friction-coefficient road surface determination flag F_DVF2W=1 is set. In contrast, if the wheel speed difference between the wheel speed of the left front wheel and the wheel speed of the right front wheel DVF2W is less than the low-friction-coefficient road surface cancel value, the low-friction-coefficient road surface determination flag F_DVF2W=0 is set.

Next, the fourth method of determining whether a road surface is a low-friction-coefficient road surface by the fourth low-friction-coefficient road surface determining device M4 will be described with reference to the flowchart of FIG. 10 which is a subroutine of the Step S1.

First, if, in Step S41, a reverse determination flag F_NSURED is not equal to 1, and a shift range is constantly a D range, and if, in Step S42, a minimum wheel speed VLEST among the wheel speeds of the four wheels is greater than or equal to a threshold value #VLKPK0 and a downslope degree determination flag F_LMPK=0 (gentle downslope, high-friction-coefficient road surface), determination of the degree of downslope in Step S47 is not performed. This is because, since slippage is to be determined by limiting to cases where the vehicle might get stuck, it is not necessary to determine the degree of the downslope when the wheel speed is high and the friction coefficient of the road surface is low.

Even if the response to the Step S42 is "no," when, in Step S43, the minimum wheel speed VLEST among the wheel speeds of the four wheels is greater than or equal to a threshold value #VLKPK0 and the downslope degree determination flag F_LMPK=1 (steep downslope, low-friction-coefficient road surface), determination of the degree of downslope in Step S47 is not performed. This is because, since slippage is not to be positively determined considering the risk of an erroneous determination at a gear position at a high vehicle speed, the determination of the degree of downslope is to be avoided when the vehicle wheel speed is high.

Even if the response to the Step S43 is "no," when, in Step S44, a maximum wheel speed VHEST among the wheel speeds of the four wheels is less than or equal to a threshold value #VLMKPKE, determination of the degree of downslope in Step S47 is not performed. This is because, since it is necessary for the wheels to be rotating in order to determine the degree of downslope, the degree of downslope cannot be precisely determined when the maximum wheel speed VHEST among the wheel speeds of the four wheels is less than or equal to the threshold value #VLMKPKE.

If, in the Step S41, the reverse determination flag F_NSURED=1, and the shift range is a reverse range, the process skips the Steps S42 and S43, and proceeds to Step S44. This is because, since it is necessary to positively determine slippage in the reverse range, the slippage is to be determined without considering the conditions of the Steps S42 and S43.

Accordingly, when the response to the Steps S42 to S44 are all "no," a downslope degree SPKU is calculated in Step S45. More specifically, the relationship of a standard vehicle body acceleration to engine output at a flat road where the road surface friction coefficient is high is previously stored, and the larger the amount by which a vehicle body acceleration actually occurring at a downslope path exceeds the standard vehicle body acceleration, the downslope degree SPKU is calculated as a large value. Here, if due to a small road surface friction coefficient, the wheels slip and the wheel speed is increased, an apparent vehicle body acceleration is calculated to a large value, as a result of which the downslope degree SPKU is calculated as an even larger value. Therefore, if the downslope degree SPKU is a large value at which slippage of the wheels does not occur at a gripped state of the wheels, it is possible to determine that the road surface is a low-friction-coefficient road surface.

Here, since, in order to determine the road surface friction coefficient, the wheel speed sensors SaF and SaR are not used and the differential gear rotational speed sensors Se and Se are used, the determination is not influenced by a failure in the wheel speed sensors SaF and SaR.

Next, if, in Step S46, the downslope degree determination flag F_LMPK=0 (gentle downslope, high-friction-coefficient road surface), and, in Step S47, the downslope degree SPKU exceeds a slippage determination downslope degree threshold value, it is determined that the road surface friction coefficient is low. Therefore, in Step S48, the downslope degree determination flag F_LMPK=1 (steep downslope, low-friction-coefficient road surface) is set.

In contrast, if any one of the responses to the Steps S42, S43, and S44 is "yes," or the response to the Step S46 is "no," when, in Step S49, the downslope degree SPKU is less than a non-slippage determination threshold value, the road surface friction coefficient is determined as being high. Therefore, in Step S50, the downslope degree determination flag F_LMPK=0 (gentle downslope, high-friction-coefficient road surface) is set.

FIG. 11 summarizes strong points and weak points of the above-described four methods of determining the road surface friction coefficient.

The first low-friction-coefficient road surface determining device M1 compares the difference between the maximum wheel speed and the minimum wheel speed among the wheel speeds of all of the wheels with a threshold value, and determines that the road surface is a low-friction-coefficient road surface when the difference exceeds the threshold value. Therefore, the first low-friction-coefficient road surface determining device M1 can determine that the road surface is a low-friction-coefficient road surface even if any one of the four wheels has slipped. However, when a failure occurs in both the wheel speed sensors SaF and SaR of the four wheels, the determination cannot be made. In addition, considering rotation steering angles of the front wheels, it is necessary to set a threshold value. Further, the determination is influenced by the failure in the wheel speed sensors SaR of the rear wheels.

The second low-friction-coefficient road surface determining device M2 compares the difference between the average value of the wheel speeds of the left and right front wheels and the average value of the wheel speeds of the left and right rear wheels with a threshold value, and determines that the road surface is a low-friction coefficient road surface when the difference exceeds the threshold value. Therefore, the second low-friction-coefficient road surface determining device M2 can determine that the road surface is a low-friction-coefficient road surface without being influenced by the rotation steering angles of the front wheels. However, the difference between the road surface friction coefficients for the left and right wheels cannot be determined. In addition, the determination is influenced by the failure in the wheel speed sensors SaF and SaR of the rear wheels.

The third low-friction-coefficient road surface determining device M3 compares the difference between the wheel speed of the left driving wheel (left front wheel) and the wheel speed of the right driving wheel (right front wheel) with a threshold value, and determines that the road surface is a low-friction-coefficient road surface when the difference exceeds the threshold value. Therefore, the third low-friction-coefficient road surface determining device M3 can reliably determine a dangerous state in which the front-wheel differential gear Df is capable of differential rotation due to the low-friction-coefficient road surface. However, the third low-friction-coefficient road surface determining device M3 can only determine the friction coefficient of the road surface that the front wheels are on.

The fourth low-friction-coefficient road surface determining device M4 compares the standard vehicle body acceleration, calculated from driving force of the engine E, with an actual vehicle body acceleration, calculated from the front differential gear Df and the rear differential gear Dr, and determines that the road surface is a low-friction-coefficient road surface when an amount by which the actual vehicle body acceleration exceeds the standard vehicle body acceleration exceeds a threshold value. Therefore, the fourth low-friction-coefficient road surface determining device M4 can determine that the road surface is a low-friction-coefficient road surface even if all of the four wheels slip, and the determination is not influenced by a failure occurring in the wheel speed sensors SaF and SaR since the rotational speeds of the differential gears Df and Dr are used. However, determination precision is low for a road surface having a very small friction coefficient.

Figure 12:
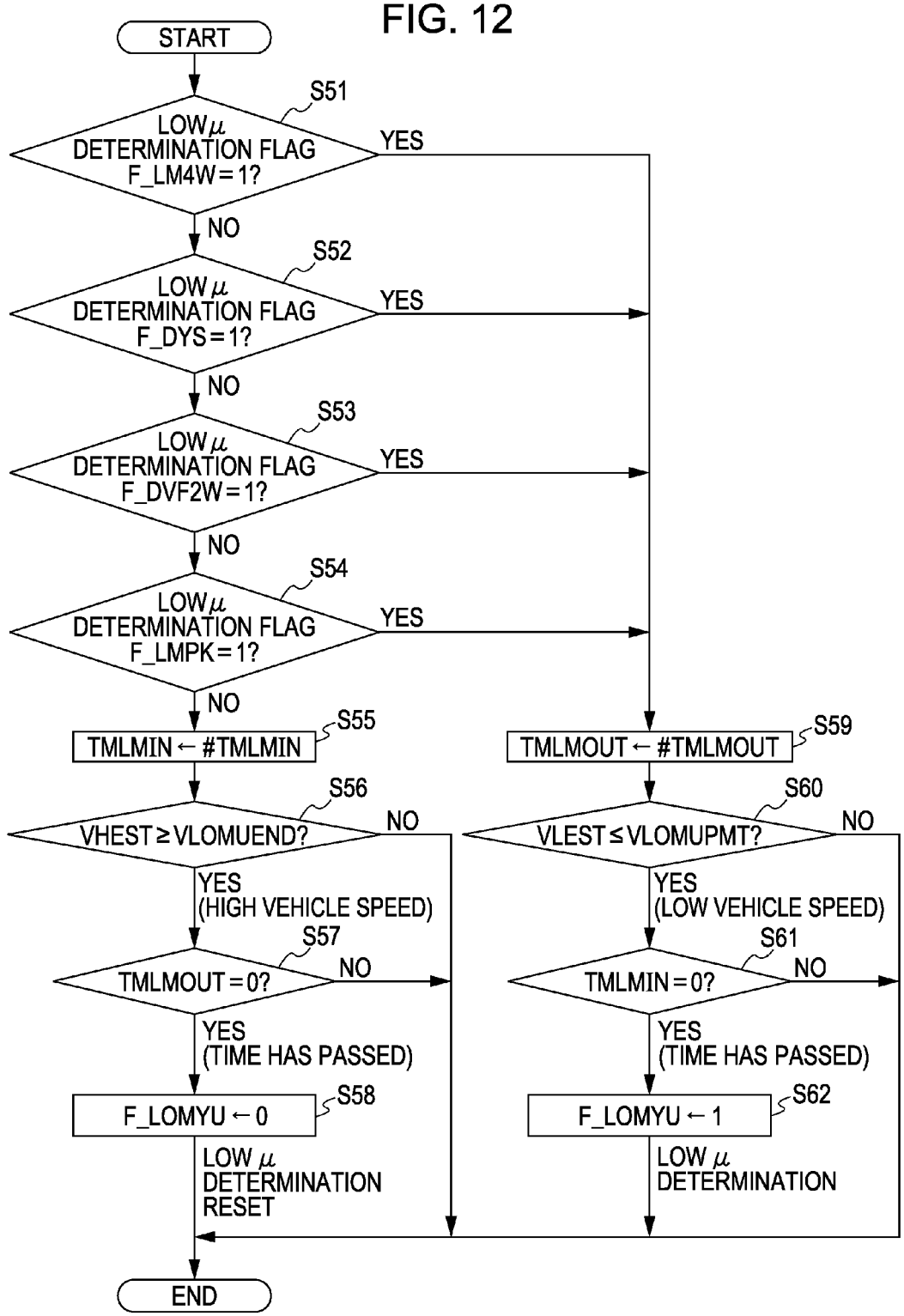
FIG. 12 is a flowchart of a subroutine of Step S2 of the main routine.

Next, a subroutine of the Step S2 (determination of integrated low-friction-coefficient road surface) will be described with reference to the flowchart of FIG. 12.

In Step S51, a state for a first low-friction-coefficient road surface determination flag F_LM4W is determined. In Step S52, a state for a second low-friction-coefficient road surface determination flag F_DYS is determined. In Step S53, a state for a third low-friction-coefficient road surface determination flag F_DVF2W is determined. In Step S54, a state for the downslope degree determination flag F_LMPK is determined.

If the responses to the Steps S51 to S54 are all "0" (which indicates that the road surface is a high-friction-coefficient road surface), the process proceeds to Steps S55 to S58. If the response to at least one of the Steps S51 to S54 is "1" (which indicates that the road surface is a low-friction-coefficient road surface), the process proceeds to Steps S59 to S62.

If the responses to the Steps S51 to S54 are all "0" (which indicates that the road surface is a high-friction-coefficient road surface), first, in Step S55, a determination delay timer TMLMIN is set to a predetermined value #TMLMIN. If, in Step S56, the maximum wheel speed VHEST among the wheel speeds of the four wheels is greater than or equal to a determination cancel threshold value VLOMUEND, and, in Step S57, the time of the determination delay timer TMLMOUT is up, then, in Step S58, the integrated low-friction-coefficient road surface determination flag F_LOMYU=0 (high-friction-coefficient road surface) is set.

If the response to any one of the Steps S51 to S54 is "1" (which indicates that the road surface is a low-friction-coefficient road surface), first, in Step S59, the reset delay timer TMLMOUT is set to a predetermined value #TMLMOUT. If, in Step S60, the minimum wheel speed VLEST among the wheel speeds of the four wheels is less than or equal to a determination threshold value VLOMUPMT, and, in Step S61, the time of the reset delay timer TMLMIN is up, then, in Step S62, the integrated low-friction-coefficient road surface determination flag F_LOMYU=1 (low-friction-coefficient road surface) is set.

As described above, since the road surface friction coefficient is determined by using four road surface friction coefficient determining methods together, it is possible to compensate for the weak points of the individual methods and to make use of the strong points of the individual methods to determine the road surface friction coefficient with high precision and, in particular, to determine the road surface friction coefficient with high precision even if a four-wheel driving vehicle is used.

Figure 13:
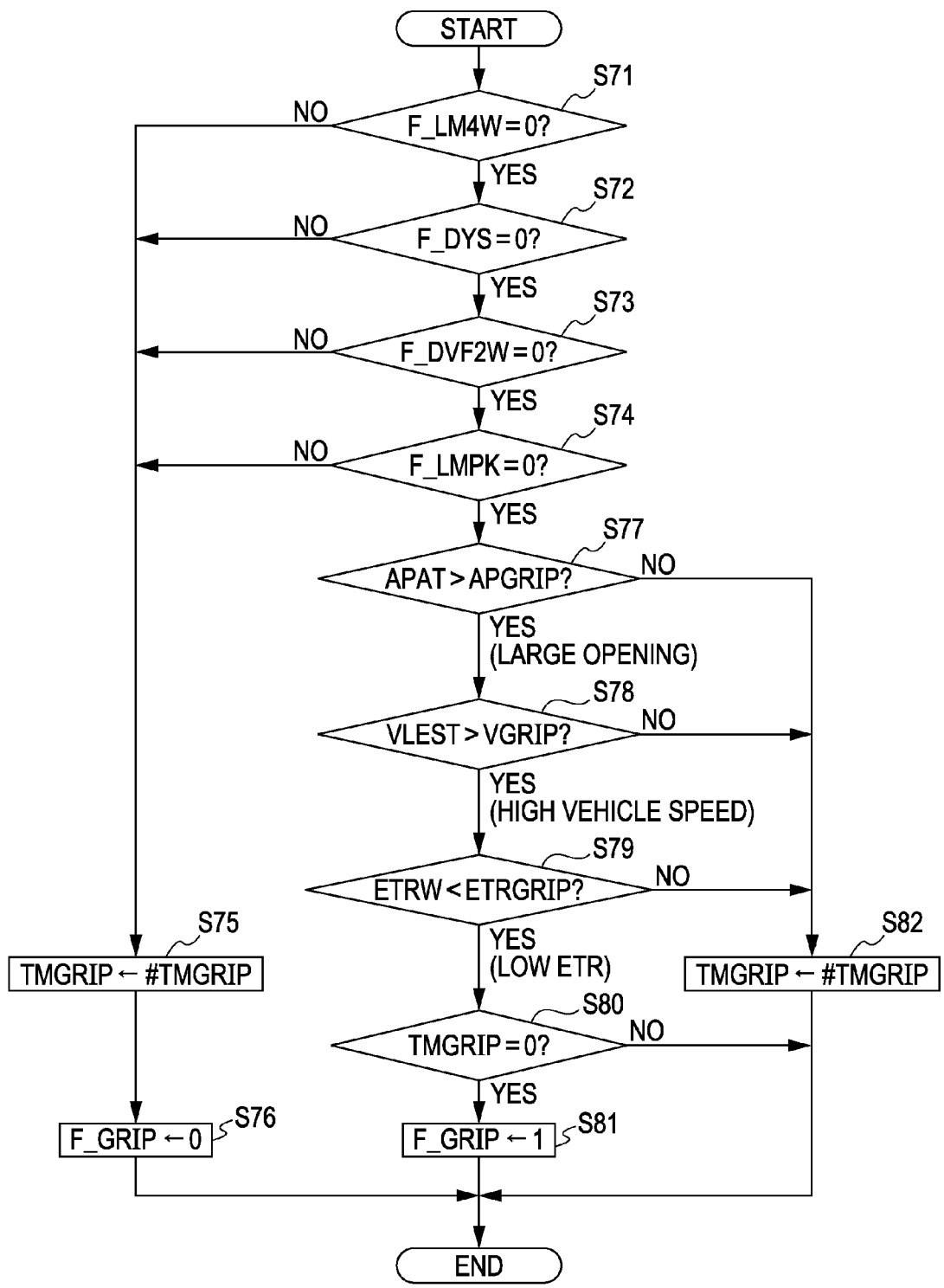
FIG. 13 is a flowchart of a subroutine of Step S3 of the main routine.

Next, a subroutine of the Step S3 (determination of grip travel) will be described with reference to the flowchart of FIG. 13.

In Step S71, a state for the first low-friction-coefficient road surface determination flag F_LM4W is determined. In Step S72, a state for the second low-friction-coefficient road surface determination flag F_DYS is determined. In Step S73, a state for the third low-friction-coefficient road surface determination flag F_DVF2W is determined. In Step S74, a state for the downslope degree determination flag F_LMPK is determined.

If the response to at least one of the Steps S71 to S74 is "1" (which indicates that the road surface is a low-friction-coefficient road surface), then, in Step S75, a grip determination delay timer TMGRIP is set to a predetermined value #TMGRIP, and, in Step S76, the grip travel determination flag F_GRIP=0 (non-grip travel) is set.

When the responses to all of the Steps S71 to S74 are "0" (which indicates that the road surface is a high-friction-coefficient road surface), if an accelerator opening APAT>a threshold value APGIP is established in Step S77, the minimum wheel speed VLEST of the wheel speeds of the four wheels>a threshold value VGRIP is established in Step S78, a torque converter slip ratio ETRW>a threshold value ETRGRIP is established in Step S79, that is, if an accelerator pedal is sufficiently pressed, the vehicle speed is sufficiently high, and a torque converter is sufficiently slipping (wheel load is high), it is determined that the wheels are gripping the road surface. If this state continues until the time of the grip determination delay timer TMGRIP is up in Step S80, the grip travel determination flag F_GRIP=1 (grip travel) is set.

In contrast, if the response to any of the Steps S77 to S79 is "no," it cannot be determined that the wheels are gripping the road surface. Therefore, in Step S82, the grip determination delay timer TMGRIP is set to the predetermined value #TMGRIP.

Figure 14:
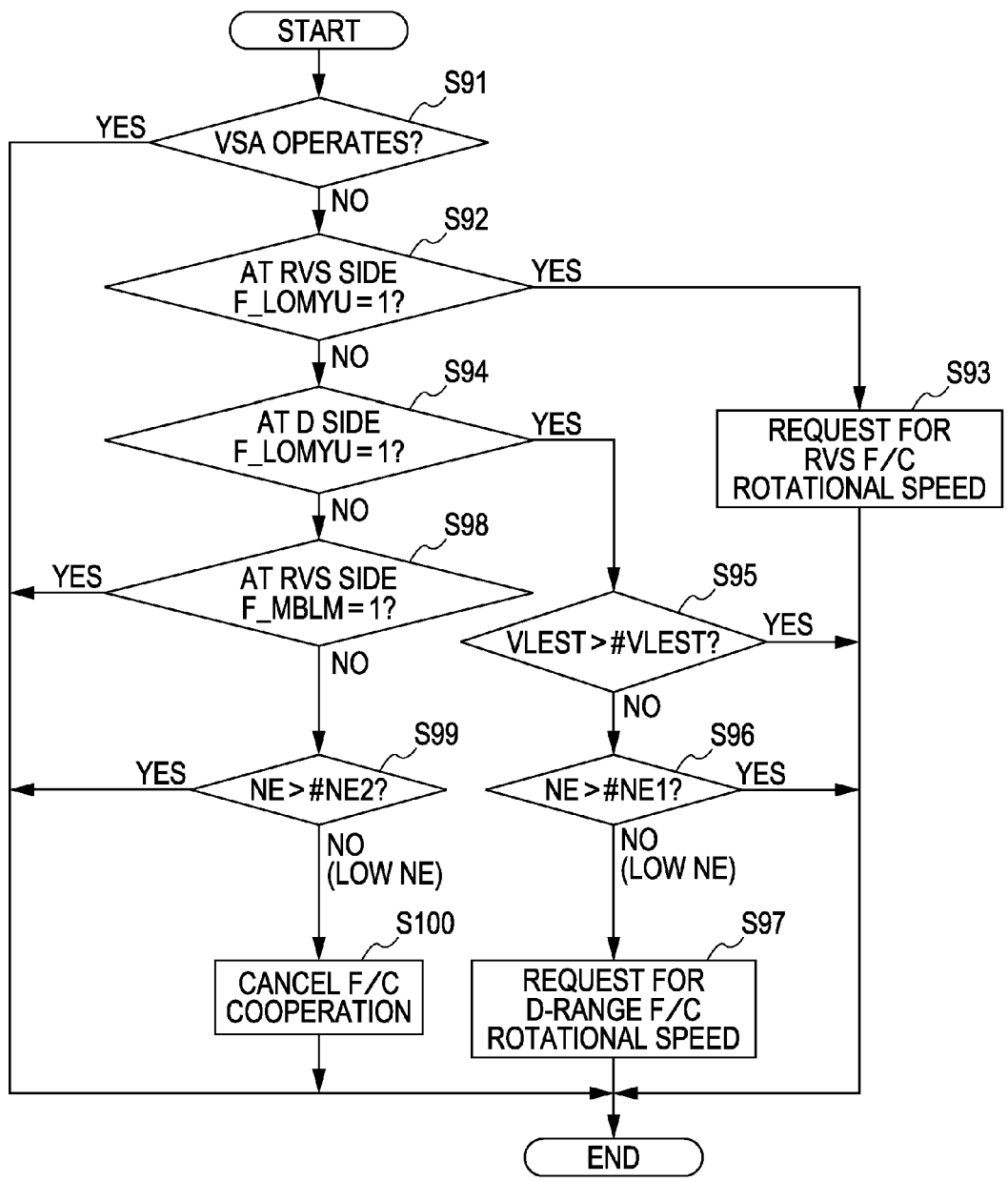
FIG. 14 is a flowchart of a subroutine of Step S5 of the main routine.

Next, a subroutine of the Step S5 (request for shifting fuel cut rotational speed) will be described with reference to the flowchart of FIG. 14. This routine is executed when the integrated low-friction-coefficient road surface determining device M5 determines that the integrated low-friction-coefficient road surface determination flag F_LOMYU=1 (low-friction-coefficient road surface).

First, if, in Step S91, a Vehicle Stability Assist (VSA) system (that is, a system that stabilizes the movement of a vehicle by distributing braking force or driving force to the left and right wheels) operates, fuel-cut control for preventing interference with the operation of the VSA is not performed.

If, in Step S92, in the reverse range of the transmission T, the integrated low-friction-coefficient road surface determination flag F_LOMYU=1 (low-friction-coefficient road surface), then, in Step S93, a request is made for a reverse-range fuel-cut rotational speed to prevent slippage of the wheels rotating backward. If the rotational speed of the engine exceeds the fuel-cut rotational speed, the fuel cut is executed to restrict output of the engine E. By this, when moving backward to escape from a stuck state on a snow-covered road or when starting the vehicle in a backward direction on ice, it is possible to prevent a slippage state of the wheels (where the rotational speed of the engine increases excessively) from becoming deteriorated. The shifting of the fuel-cut rotational speed in the reverse range is performed only when it is determined that the road surface is a low-friction-coefficient road surface (that is, when the integrated low-friction-coefficient road surface determination flag F_LOMYU=1), and is not performed when there is suspicion of the road surface being a low-friction-coefficient road surface (that is, when the low-friction-coefficient road surface suspect determination flag F_MBLM=1).

If, subsequently, in Step S94, the integrated low-friction-coefficient road surface determination flag F_LOMYU=1 (low-friction-coefficient road surface), the process proceeds to Steps S95 to S97. If, in Step S95, the minimum wheel speed VLEST among the wheel speeds of the four wheels has not exceeded a threshold value #VLEST, and, in Step S96, an engine rotational speed NE has not exceeded a threshold value #NE1, that is, if the wheel speed and the engine rotational speed are both small, then, in Step S97, a request is made for a D-range fuel-cut rotational speed. If the engine rotational speed exceeds the fuel-cut rotational speed, fuel cut is performed to restrict the output of the engine E.

The reason is as follows. If the engine output is reduced by performing a fuel-cut operation during drifting, it may be difficult to control the movement of the vehicle. Therefore, the fuel-cut operation during the drifting where the wheel speed and the engine rotational speed are both high is not easily performed. Consequently, when escaping from a stuck state on a snow-covered road or when starting the vehicle on ice when the wheel speed and the engine rotation speed are both low, a fuel-cut operation is easily performed to prevent slippage.

If, in the Step S94, the integrated low-friction-coefficient road surface determination flag F_LOMYU=0 (high-friction-coefficient road surface), then, in Step S100, the fuel-cut control is canceled. In contrast, if, in Step S98, the low-friction-coefficient road surface suspect determination flag F_MBLM=1 (there is suspicion of the road surface being a low-friction-force road surface), and if, in Step S99, the engine rotational speed NE exceeds a threshold value #NE2, the fuel-cut control is not cancelled.

As described above, at the low-friction-coefficient road surface, by shifting the fuel-cut rotational speed not only in the reverse range but also in the D range, it is possible not only to prevent slippage caused by excessive driving force even when the vehicle moves forward, but also to set a fuel-cut rotational speed that is suitable for when the vehicle is traveling backward and forward.

Figure 15:
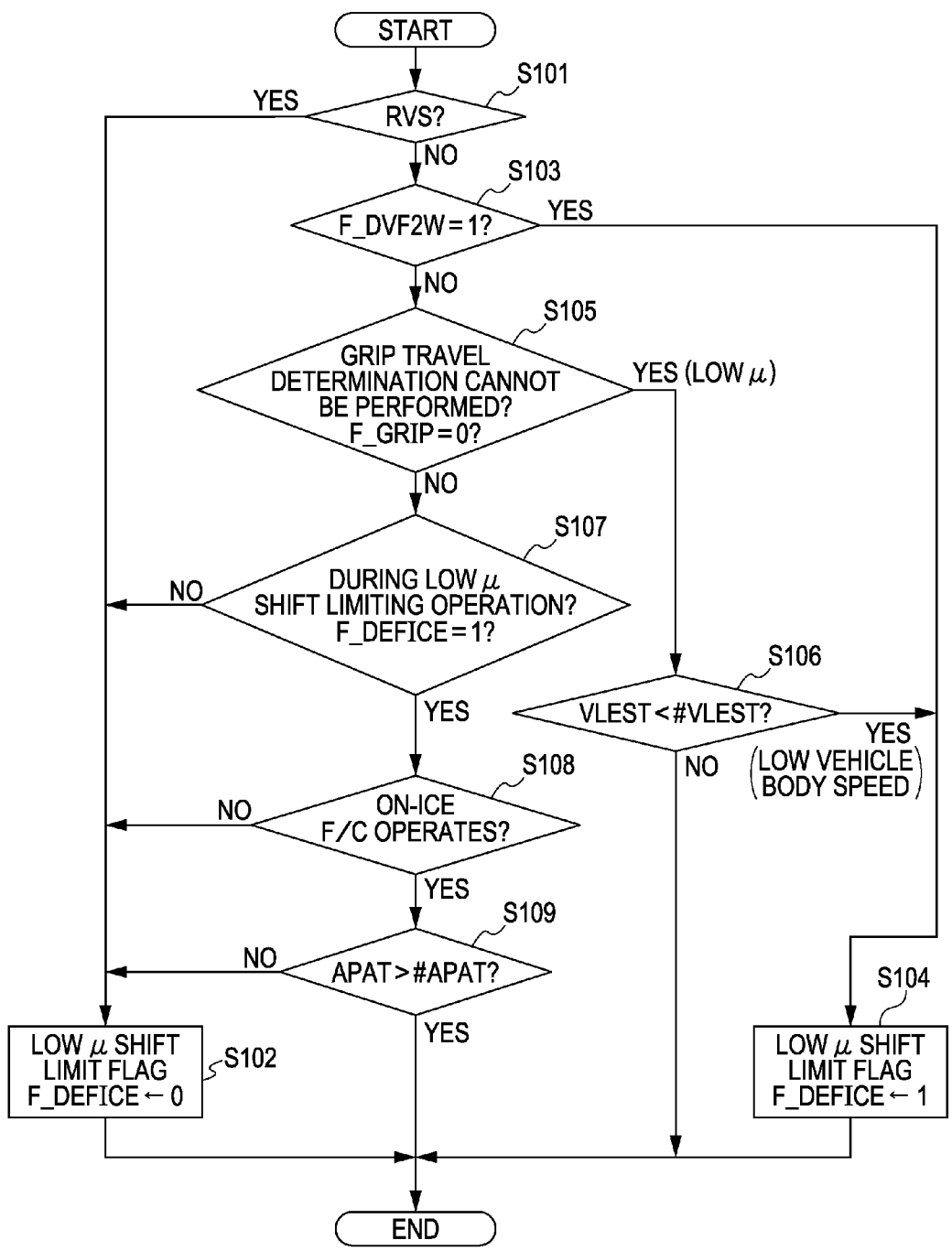
FIG. 15 is a flowchart of a subroutine of Step S7 of the main routine.

Next, a subroutine of the Step S7 (shift limiting operation) will be described with reference to the flowchart of FIG. 15. This routine is executed when the integrated low-friction-coefficient road surface determining device M5 determines that the integrated low-friction-coefficient road surface determination flag F_LOMYU=1 (low-friction-coefficient road surface), and when the seventh low-friction-coefficient road surface suspect determining unit M7 determines that the low-friction-coefficient road surface suspect determination flag F_MBLM=1 (there is suspicion of the road surface being a low-friction-force road surface).

First, if, in Step S101, the transmission T is in the reverse range, upshifting and downshifting are incapable of being performed. Therefore, in Step S102, a low-friction-coefficient road surface shift limit flag F_DEFICE is set to 0 (shifting is not limited).

If, in the Step S101, the transmission T is in the D range, and, in Step S103, a low-friction-coefficient road surface determination flag F_DVF2W=1 (low-friction-coefficient road surface) by using the third method (that is, if the wheel speed difference between the wheel speeds of the left and right front wheels exceeds a threshold value and it is determined that the road surface is a low-friction-coefficient road surface), then, in Step S104, the low-friction-coefficient road surface shift limit flag F_DEFICE is set to 1 (shifting is limited). This is because the case in which the wheel speed difference between the wheel speeds of the left and right front wheels exceeds the threshold value corresponds to a case in which one of the left and right front wheels (driving wheels) moves onto a snow-covered road and slips, thereby making it possible for the vehicle to get stuck due to an increase in a driving force when downshifting is allowed in such a case.

If, in Step S103, the low-friction-coefficient road surface determination flag F_DVF2W=0 (high-friction-coefficient road surface) by using the third method, and, in Step S105, a grip travel flag FGRIP=0 (low-friction-coefficient road surface) (that is, if it is determined that the road surface is a low-friction-coefficient road surface by any one of the first, second and fourth methods (or by a method other than the third method)) when, in Step S106, the minimum wheel speed VLEST exceeds the threshold value #VLEST, the low-friction-coefficient road surface shift limit flag F_DEFICE is set to 1 (shifting is limited) in Step S104.

The reason is as follows. That is, if the road surface is determined as being a low-friction-coefficient road surface by any one of the first, second, and fourth methods, this does not necessarily mean that one of the left and right front wheels (driving wheels) is on a snow-covered road and is slipping, that is, the vehicle may be drifting. Therefore, if the minimum wheel speed VLEST (that is, the vehicle body speed) is small, assuming that the vehicle is getting stuck, the low-friction-coefficient road surface shift limit flag F_DEFICE is set to 1 (shifting is limited) in Step S104 and downshifting is restricted, so that it is possible to restrict generation of excessive torque. Consequently, the vehicle can smoothly escape from the stuck state.

If, in the Step S104, the low-friction-coefficient road surface shift limit flag F_DEFICE is set to 1 (shifting is limited), when the accelerator opening exceeds a threshold value, the limiting of the downshifting is continued, whereas, when the accelerator opening is less than or equal to the threshold value (for example, fully closed state), the downshifting is allowed. This is because, although, when the accelerator opening is large, the vehicle may get stuck due to an increase in a driving force by the downshifting, the vehicle does not get stuck when the accelerator opening is small.

If the response to the Step S105 is "no," and the road surface is determined as being a high-friction-coefficient road surface, and, if, in Step S107, the low-friction-coefficient road surface shift limit flag F_DEFICE is set to 1 and shifting is limited, when fuel-cut control is not performed in Step S108, it is determined that the road surface is a high-friction-coefficient road surface and that the shifting does not need to be limited. Therefore, in the Step S102, the low-friction-coefficient road surface shift limit flag F_DEFICE is set to 0 (shift limiting is cancelled). Even if, in the Step S108, the fuel-cut control is performed, when the accelerator opening APAT is less than or equal to a threshold value #APAT in Step S109, it is determined that the shifting does not need to be limited. Therefore, in Step S102, the low-friction-coefficient road surface shift limit flag F_DEFICE is set to 0 (shift limiting is cancelled).

Figure 16:
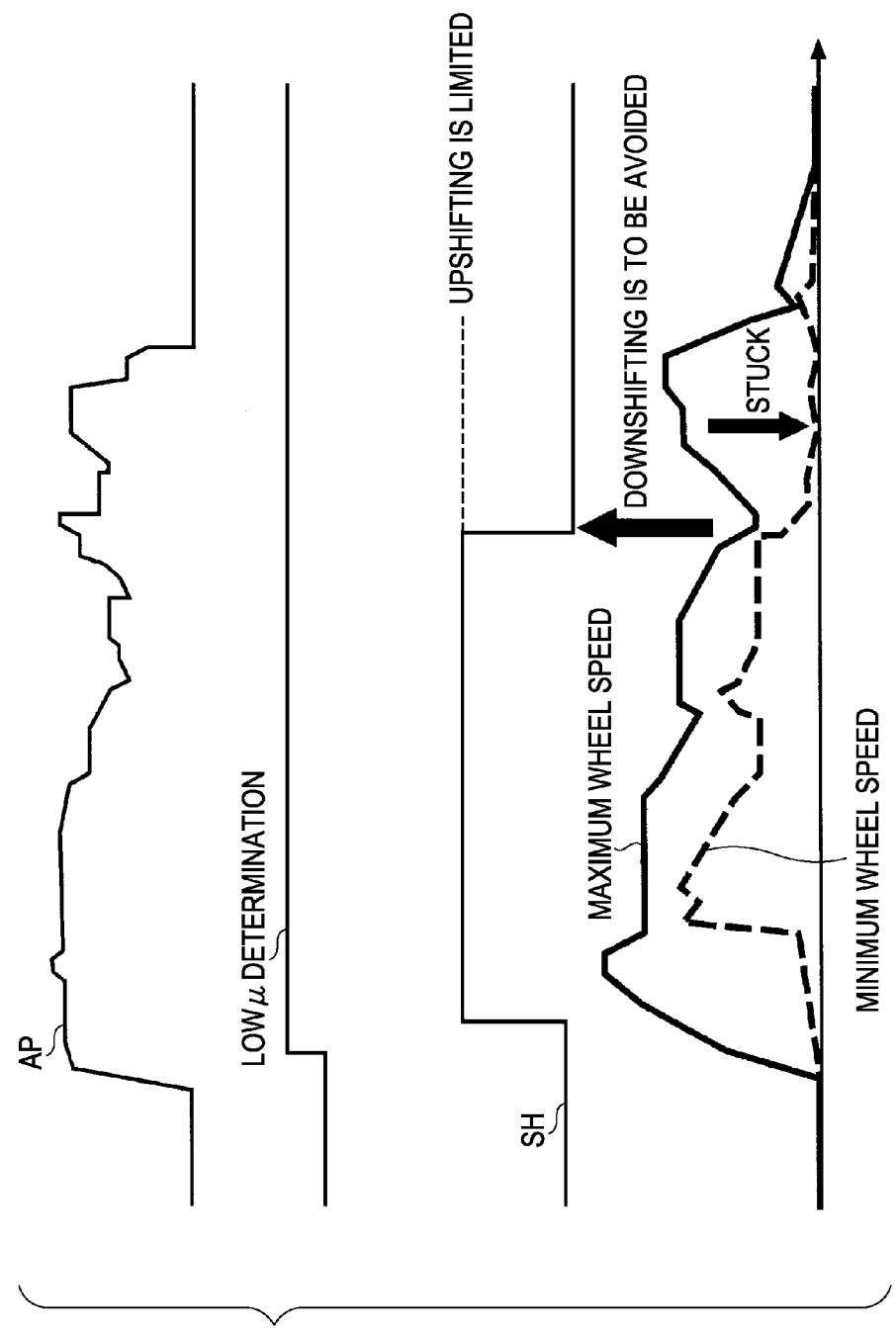
FIG. 16 is a time chart in correspondence with FIG. 15.

As shown in FIG. 16, if the vehicle is getting stuck in an upwardly sloping snow-covered road while it travels, when downshifting is executed and a driving force is increased, the vehicle may get stuck by digging up the snow. However, it is possible to previously prevent the stuck state from occurring by limiting the downshifting.

Next, additional functions of the first low-friction-coefficient road surface determining device M1 and the second low-friction-coefficient road surface determining device M2 shown in FIG. 2 will be described. The first low-friction-coefficient road surface determining device M1 and the second low-friction-coefficient road surface determining device M2 both determine whether a road surface is a low-friction-coefficient road surface by using rear-wheel speeds. However, if an abnormality occurs in the rear-wheel speed sensors SaR and correct rear-wheel speeds are not output, the road surface may be erroneously determined as being a low-friction-coefficient road surface. In such a case, if the driving force controller M8 performs driving force control for, for example, limiting shift change control of the transmission T or fuel cut of the engine E, on the basis of an erroneous road surface friction coefficient, the transmission T may become damaged or drivability of the vehicle may become deteriorated.

Figure 17:
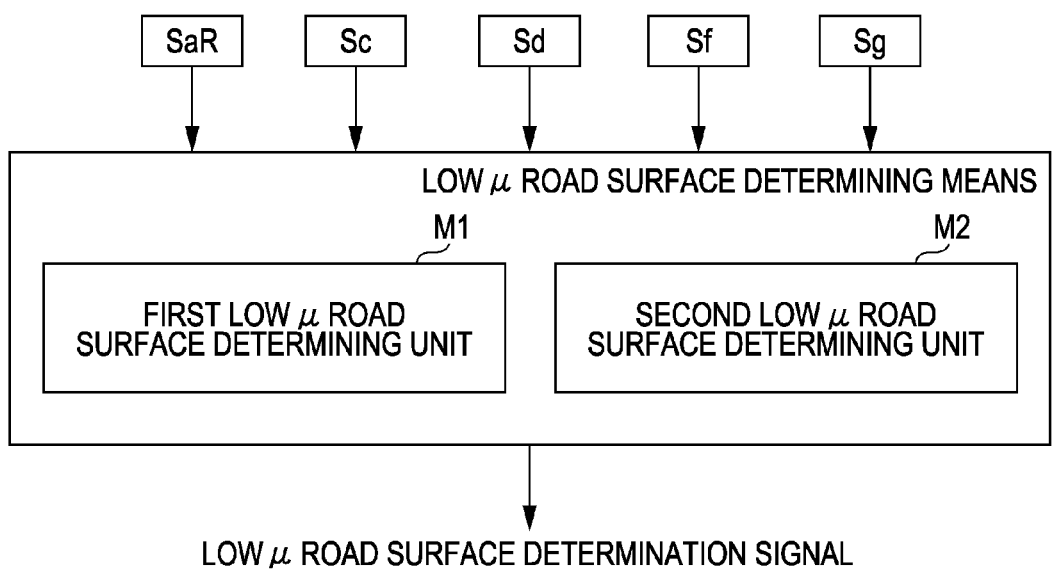
FIG. 17 shows sensors connected to the first and second low-friction-coefficient road surface determining units.

As shown in FIG. 17, the rear-wheel speed sensors SaR that detect the wheel speeds of the left and right rear wheels, the shift range sensor Sc that detects a shift range of the transmission T, the accelerator opening sensor Sd that detects an accelerator opening, the transmission input shaft rotational speed sensor Sf that detects the rotational speed of an input shaft of the transmission T, and the transmission output shaft rotational speed sensor Sg that detects the rotational speed of the output shaft of the transmission T are connected to the first low-friction-coefficient road surface determining device M1 and the second low-friction-coefficient road surface determining device M2.

Since the rotational speeds of the front wheels are in correspondence with the rotational speed of the output shaft of the transmission T, any abnormality of the front-wheel speed sensors SaF can be easily and precisely determined by using an output of the transmission output shaft rotational speed sensor Sg. On the contrary, such an abnormality determining operation cannot be performed for the rear-wheel speed sensors SaR, that is, abnormalities of the rear-wheel speed sensors SaR can rarely easily and precisely be determined. Therefore, rear-wheel speeds that are input to the first low-friction-coefficient road surface determining device M1 and the second low-friction-coefficient road surface determining device M2 may be abnormal.

Control that is described below corresponds to that when an abnormality occurs in the rear-wheel speed sensors SaR.

Figure 18:
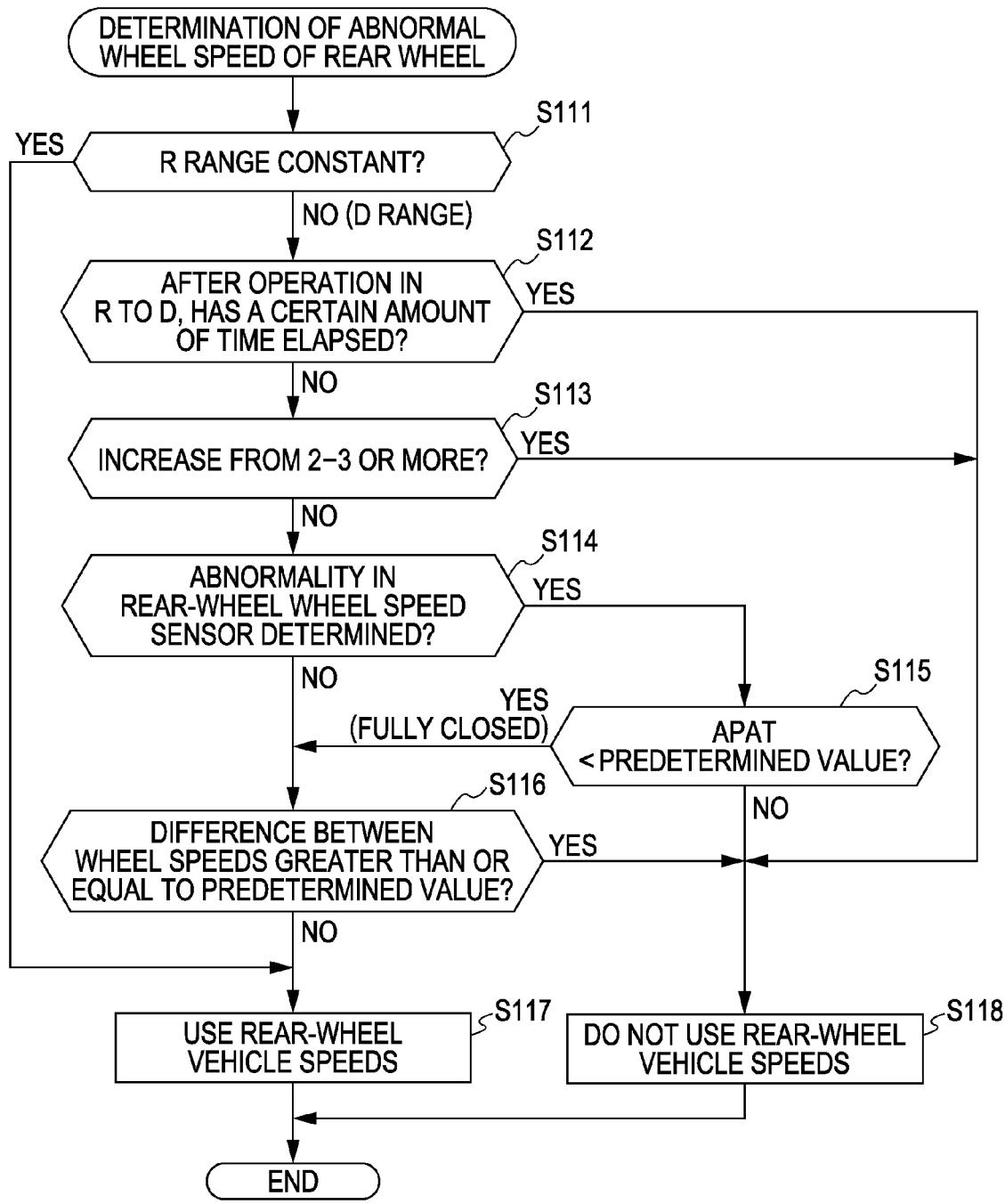
FIG. 18 is a flowchart of a rear-wheel speed abnormality determination routine.

If, in Step S111 in the flowchart of FIG. 18, a shift range detected by the shift range sensor Sc is an "R" range, the process proceeds to Step S117 and rear-wheel speeds output by the rear-wheel speed sensors SaR are used as they are as rear-wheel speeds. This is because, since, in the "R" range, protection control of the transmission T is not performed, no problems occur even if the rear-wheel speeds are abnormal.

Figure 20:
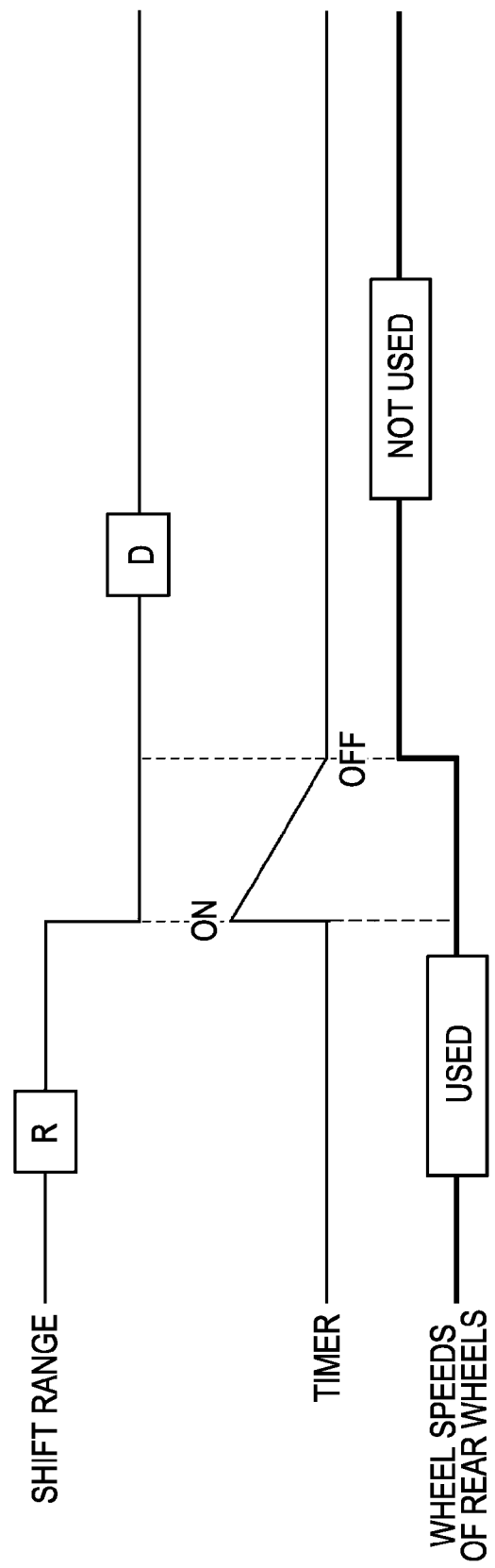
FIG. 20 illustrates Step S112.

If, in Step S112, the shift range sensor Sc detects that a predetermined time has elapsed from when the "R" range is switched to a "D" range, the process proceeds to Step S118 and the rear-wheel speeds that are output by the rear-wheel speed sensors SaR are not used (see FIG. 20). The reason is as follows. If the vehicle gets stuck at a low-friction-coefficient road surface, and a driver tries to escape from the stuck state by moving the vehicle back and forth by frequently moving a shift lever between the "R" range and the "D" range, when the predetermined time has elapsed from when the "R" range is switched to the "D" range, it is determined that the driver has successfully escaped from the stuck state and that there is no possibility of frequent switching of the shift range. When, in this state, the driver moves the vehicle, if abnormal rear-wheel speeds output from the defective rear-wheel speed sensors SaR are used, drivability is hindered because unnecessary fuel cut or an unnecessary shift change limiting operation is performed.

If, in Step S113, it is detected that a shift position calculated from an output of the transmission output shaft rotational speed sensor Sg and an output of the transmission input shaft rotational speed sensor Sf is changed from a second gear to a third gear, the process proceeds to the Step S118 and the rear-wheel speeds output by the rear-wheel speed sensors SaR are not used. The reason is as follows. When the shift position is shifted from the second gear to the third gear, it is determined that the vehicle has escaped from the stuck state, If abnormal rear-wheel speeds are used in this state, drivability is hindered because unnecessary fuel cut or an unnecessary shift change limiting operation is performed.

If the responses to the Steps S112 and S113 are "no," that is, if the predetermined time has not elapsed from when the shift range is changed from the "R" range to the "D" range and the shift position has not yet changed from the second gear to the third gear, rear-wheel speeds that basically cannot be determined as being normal or abnormal are used as they are. The reason is as follows. If the responses to the Steps S112 and S113 are "no," the vehicle is still in a state directly after starting. Therefore, even if abnormal rear-wheel speeds are used and the road surface is erroneously determined as being a low-friction-coefficient road surface, drivability is almost never hindered even when unnecessary fuel cut or an unnecessary shift change limiting operation is performed.

However, the use of abnormal rear-wheel speeds is to be minimized. Therefore, if an abnormality in the rear-wheel speed sensors SaR is determined by a simple method, control that does not use abnormal rear-wheel speeds is performed.

As described above, since it is difficult to precisely determine whether or not the rear-wheel speed sensors SaR are outputting normal values, in Step S114, it is determined that a simple abnormality, such as the rear-wheel speed sensors SaR not performing an output operation due to a cut line, has occurred in the rear-wheel speed sensors SaR. If, in the Step S112, the predetermined time has not elapsed from when the shift range has switched from the "R" range to the "D" range, and, in the Step S113, it is not detected that the shift position has changed from the second gear to the third gear, when it is determined that the rear-wheel speed sensors SaR are abnormal in the Step S114, the process does not proceed to the Step S118 and rear-wheel speeds that are output by the rear-wheel speed sensors SaR are not used until the accelerator opening detected by the accelerator opening sensor Sd becomes less than a predetermined value in Step S115. The reason is as follows. After an abnormality is temporarily detected in the rear-wheel speed sensors SaR, the determination result is held while the vehicle is accelerating when the accelerator opening is greater than or equal to the predetermined value, so that an abnormality in the rear-wheel speed sensors SaR can be stably detected.

If, in the Step S114, the rear-wheel speed sensors SaR are not abnormal, or, even if they are abnormal in Step S114 and the accelerator opening is less than the predetermined value in the Step S115, an abnormality in the rear-wheel speed sensors SaR is detected by a different simple method. That is, if, in Step S116, the difference between front-wheel rotational speeds calculated from an output shaft rotational speed of the transmission T, which the transmission output shaft rotational speed sensor Sg outputs, and the average value of the wheel speeds of the left and right rear wheels, detected by the left and right rear-wheel speed sensors SaR, is greater than or equal to a predetermined value, it is determined that an abnormality has occurred in the rear-wheel speed sensors SaR. Therefore, in the Step S118, the rear-wheel speeds are not used. On the other hand, if the difference is less than the predetermined value, it is determined that the rear-wheel speed sensors SaR are not abnormal, and the rear-wheel speeds are used in Step S117.

Even if, when the rear-wheel speeds are used in the Step S117, the rear-wheel speeds are abnormal, it is erroneously determined that the road surface is a low-friction-coefficient road surface, and unnecessary fuel cut or an unnecessary shift change limiting operation is performed, the vehicle is still in a state immediately after starting. Therefore, drivability is not hindered.

Figure 19:
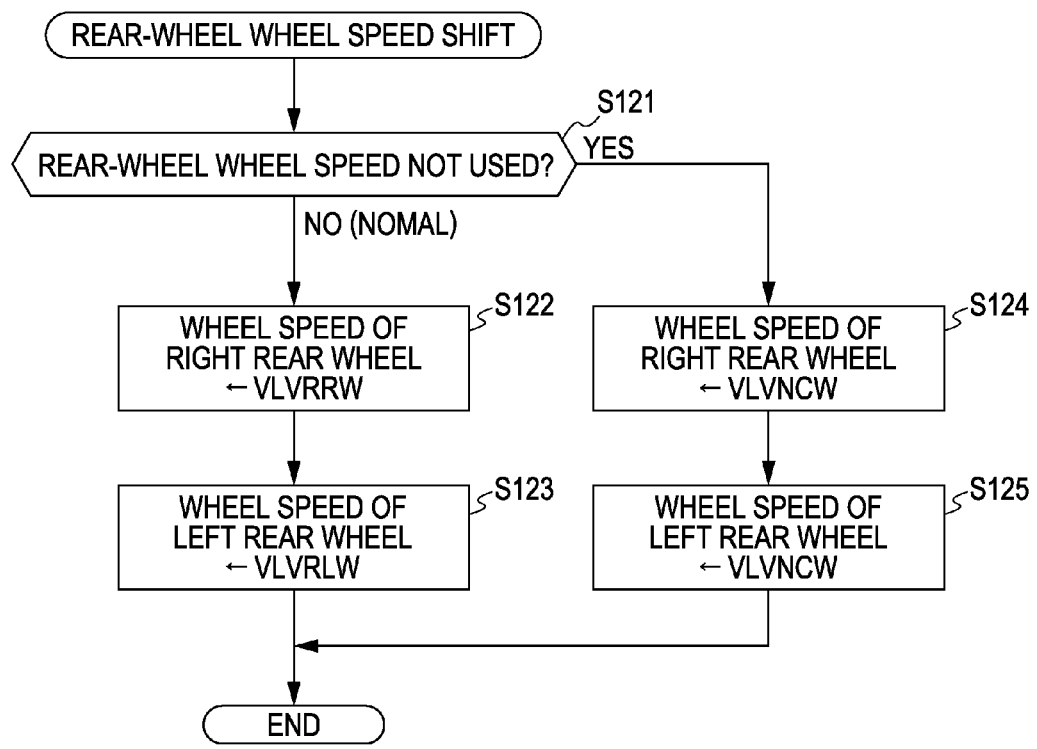
FIG. 19 is a flowchart of a rear-wheel speed shift routine.

Accordingly, if the rear-wheel speeds are used in Step S121 of the flowchart of FIG. 19, an output VLVRRW of the right-rear-wheel speed sensor SaR is used as it is as the wheel speed of the right rear wheel in Step S122, and an output VLVRLW of the left-rear-wheel speed sensor SaR is used as it is as the wheel speed of the left rear wheel in Step S123. On the contrary, if the rear-wheel speeds are not used in the Step S121, front wheel rotational speeds VLVNCW calculated from the calculation of the output shaft rotational speed of the transmission T that the transmission output shaft rotational speed sensor Sg outputs are used as the rear-wheel speeds of the left and right rear wheels in Steps S124 and S125.

Accordingly, if the predetermined time has not elapsed from when the shift range has switched from the "R" range to the "D" range, and the shift position has not changed from the second gear to the third gear (that is, if protection of the transmission T with respect to excessive torque input is required), even if the rear-wheel speed sensors SaR may be abnormal, the rear-wheel speeds detected by the rear-wheel speed sensors SaR are used to determine whether or not the road surface is a low-friction-coefficient road surface. In other situations not requiring the protection of the transmission T, the rear-wheel speeds detected by the rear-wheel speed sensors SaR are not used; instead, the front wheel rotational speeds VLVNCW calculated from the calculation of the rotational speed of the output shaft of the transmission T are used as the left and right rear-wheel speeds. Therefore, while reliably preventing the input of excessive torque to the transmission T from becoming the cause of damage, it is possible to ensure drivability when unnecessary fuel cut or an unnecessary shift change limiting operation, resulting from an erroneous determination of the road surface being a low-friction-coefficient road surface based on erroneous rear-wheel speeds, from being performed.

Although embodiments of the present invention are described, various design modifications may be made without departing from the gist of the present invention.

For example, the present invention is not limited to the method of determining whether a road surface is a low-friction-coefficient road surface by using rear-wheel speeds.

According to the structure of the embodiment of the present invention, when a predetermined condition is established, the low-friction-coefficient road surface determining device that determines whether a road surface is a low-friction-coefficient road surface using at least the rear-wheel speeds detected by the rear-wheel speed sensor prohibits the determination of whether the road surface is a low-friction-coefficient road surface using the rear-wheel speeds, if, among conditions of (a) the rear-wheel speed sensor being abnormal, (b) a predetermined time having elapsed from when a shift range is changed from a reverse range to a drive range, and (c) a gear position having become greater than or equal to a predetermined gear position, the condition (a) is established or at least one of the conditions (b) and (c) is established.

By this, when an abnormality occurs in the rear-wheel speed sensor on the basis of the condition (a), it is possible to prevent improper vehicle control caused by an erroneous determination that the road surface is a low-friction-coefficient road surface based on abnormal rear-wheel speeds. When the rear-wheel speeds which may be abnormal when the transmission does not need to be protected on the basis of the conditions (b) and (c) are not used, unnecessary driving force control, such as limiting of a shift change or a fuel cut based on the erroneous determination that a road surface is a low-friction-coefficient road surface is not performed, thereby making it possible to ensure drivability. In addition, when the rear-wheel speeds are used only when the transmission needs to be protected, driving force control for, for example, restricting shift change or fuel cut based on the determination that the road surface is a low-friction-coefficient road surface is performed, thereby making it possible to protect the transmission.

The driving force controlling apparatus of the embodiment of the present invention may be such that, after the low-friction-coefficient road surface determining device has prohibited the determination of whether the road surface is a low-friction-coefficient road surface using the rear-wheel speed, the prohibition of the determination of whether the road surface is a low-friction-coefficient road surface is continued until an accelerator opening becomes less than a predetermined value.

According to this structure, the driving force controlling apparatus of the embodiment of the present invention is such that, after the low-friction-coefficient road surface determining device has prohibited the determination of whether the road surface is a low-friction-coefficient road surface using the rear-wheel speed, the prohibition of the determination of whether the road surface is a low-friction-coefficient road surface is continued until an accelerator opening becomes less than a predetermined value. Therefore, it is possible to stably control driving force by preventing the determination prohibition state from being easily cancelled.

The driving force controlling apparatus of the embodiment of the present invention may be such that, if a difference between a front-wheel speed and an average value of wheel speeds of left and right rear wheels detected by the rear-wheel speed sensor becomes greater than or equal to a threshold value while the low-friction-coefficient road surface determining device is determining whether the road surface is a low-friction-coefficient road surface using the rear-wheel speeds, the low-friction-coefficient road surface determining device prohibits the determination of whether the road surface is a low-friction-coefficient road surface using the rear-wheel speeds, the front-wheel speed being calculated from an output shaft rotational speed of the transmission.

According to this structure, the driving force controlling apparatus of the embodiment of the present invention is such that, if the difference between the front-wheel speed and the average value of wheel speeds of left and right rear wheels detected by the rear-wheel speed sensor becomes greater than or equal to a threshold value while the low-friction-coefficient road surface determining device is determining whether the road surface is a low-friction-coefficient road surface using the rear-wheel speeds, the low-friction-coefficient road surface determining device determines that the rear-wheel speed sensor is abnormal and prohibits the determination of whether the road surface is a low-friction-coefficient road surface using the rear-wheel speeds, the front-wheel speed being calculated from an output shaft rotational speed of the transmission. Therefore, it is possible to prevent improper driving force control based on abnormal rear-wheel speeds from being performed.

A first low-friction-coefficient road surface determining device M1 and a second low-friction-coefficient road surface determining device M2 according to the embodiments correspond to the low-friction-coefficient road surface determining device according to the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A driving force controlling apparatus of a vehicle, comprising:
    a driving force controller configured to determine a road surface state of a road surface along which the vehicle including an engine and a transmission travels and configured to control a driving force of the vehicle based on the determined road surface state;
    a rear-wheel speed sensor configured to detect a rear-wheel speed;
    a low-friction-coefficient road surface determining device configured to determine whether the road surface is a low-friction-coefficient road surface using at least the rear-wheel speed detected by the rear-wheel speed sensor when a predetermined condition is established; and
    a determination prohibition device configured to prohibit the low-friction-coefficient road surface determining device from determining whether the road surface is a low-friction-coefficient road surface, if (a) the rear-wheel speed sensor is abnormal, or if (b) a predetermined time has elapsed from when a shift range is changed from a reverse range to a drive range and/or (c) a gear position has become greater than or equal to a predetermined gear position.

2. The driving force controlling apparatus according to claim 1, wherein, after the determination prohibition device has prohibited the low-friction-coefficient road surface determining device from determining whether the road surface is a low-friction-coefficient road surface using the rear-wheel speed, the determination prohibition device continues prohibiting the low-friction-coefficient road surface determining device from determining whether the road surface is a low-friction-coefficient road surface until an accelerator opening becomes less than a predetermined value.

3. The driving force controlling apparatus according to claim 2, wherein, if a difference between a front-wheel speed and an average value of rear-wheel speeds of left and right rear wheels detected by the rear-wheel speed sensor becomes greater than or equal to a threshold value while the low-friction-coefficient road surface determining device is determining whether the road surface is a low-friction-coefficient road surface using the rear-wheel speeds, the determination prohibition device prohibits the low-friction-coefficient road surface determining device from determining whether the road surface is a low-friction-coefficient road surface using the rear-wheel speeds, the front-wheel speed being calculated from an output shaft rotational speed of the transmission.

4. The driving force controlling apparatus according to claim 1, wherein, if a difference between a front-wheel speed and an average value of rear-wheel speeds of left and right rear wheels detected by the rear-wheel speed sensor becomes greater than or equal to a threshold value while the low-friction-coefficient road surface determining device is determining whether the road surface is a low-friction-coefficient road surface using the rear-wheel speeds, the determination prohibition device prohibits the low-friction-coefficient road surface determining device from determining whether the road surface is a low-friction-coefficient road surface using the rear-wheel speeds, the front-wheel speed being calculated from an output shaft rotational speed of the transmission.

5. A driving force controlling apparatus of a vehicle, comprising:
    driving force controlling means for determining a road surface state of a road surface along which the vehicle including an engine and a transmission travels and for controlling a driving force of the vehicle based on the determined road surface state;
    a rear-wheel speed sensor configured to detect a rear-wheel speed;
    low-friction-coefficient road surface determining means for determining whether the road surface is a low-friction-coefficient road surface using at least the rear-wheel speed detected by the rear-wheel speed sensor when a predetermined condition is established; and
    determination prohibiting means for prohibiting the low-friction-coefficient road surface determining means from determining whether the road surface is a low-friction-coefficient road surface, if (a) the rear-wheel speed sensor is abnormal, or if (b) a predetermined time has elapsed from when a shift range is changed from a reverse range to a drive range and/or (c) a gear position has become greater than or equal to a predetermined gear position.

6. The driving force controlling apparatus according to claim 5, wherein, after the determination prohibiting means has prohibited the low-friction-coefficient road surface determining means from determining whether the road surface is a low-friction-coefficient road surface using the rear-wheel speed, the determination prohibiting means continues prohibiting the low-friction-coefficient road surface determining means from determining whether the road surface is a low-friction-coefficient road surface until an accelerator opening becomes less than a predetermined value.

7. The driving force controlling apparatus according to claim 6, wherein, if a difference between a front-wheel speed and an average value of rear-wheel speeds of left and right rear wheels detected by the rear-wheel speed sensor becomes greater than or equal to a threshold value while the low-friction-coefficient road surface determining means is determining whether the road surface is a low-friction-coefficient road surface using the rear-wheel speeds, the determination prohibiting means prohibits the low-friction-coefficient road surface determining means from determining whether the road surface is a low-friction-coefficient road surface using the rear-wheel speeds, the front-wheel speed being calculated from an output shaft rotational speed of the transmission.

8. The driving force controlling apparatus according to claim 5, wherein, if a difference between a front-wheel speed and an average value of rear-wheel speeds of left and right rear wheels detected by the rear-wheel speed sensor becomes greater than or equal to a threshold value while the low-friction-coefficient road surface determining means is determining whether the road surface is a low-friction-coefficient road surface using the rear-wheel speeds, the determination prohibiting means prohibits the low-friction-coefficient road surface determining means from determining whether the road surface is a low-friction-coefficient road surface using the rear-wheel speeds, the front-wheel speed being calculated from an output shaft rotational speed of the transmission.

* * * * *